United States Patent [19]

Cole et al.

[11] Patent Number: 5,550,373
[45] Date of Patent: Aug. 27, 1996

[54] FABRY-PEROT MICRO FILTER-DETECTOR

[75] Inventors: Barrett E. Cole, Bloomington; Bernard S. Fritz, Eagan; Robert D. Horning, Burnsville, all of Minn.

[73] Assignee: Honeywell Inc., Minneapolis, Minn.

[21] Appl. No.: 367,491

[22] Filed: Dec. 30, 1994

[51] Int. Cl.⁶ .................. G01B 9/02; G01J 3/45
[52] U.S. Cl. ............ 250/338.1; 250/339.01; 250/339.02; 356/352
[58] Field of Search ............ 250/338.1, 339.01, 250/339.02; 356/352

[56] References Cited

U.S. PATENT DOCUMENTS

| | | | |
|---|---|---|---|
| 4,508,964 | 4/1985 | Gunning, III et al. | 356/352 X |
| 4,743,114 | 5/1988 | Crane, Jr. | 356/352 X |
| 4,859,060 | 8/1989 | Katagiri et al. | 356/352 |
| 5,091,652 | 2/1992 | Mathies et al. | 250/459.1 X |
| 5,142,414 | 8/1992 | Koehler | 356/352 X |
| 5,225,888 | 7/1993 | Selwyn et al. | 356/352 X |
| 5,260,225 | 11/1993 | Liu et al. | |
| 5,408,319 | 4/1995 | Halbout et al. | 356/352 |

OTHER PUBLICATIONS

D. B. Fenner et al., "IR Transform Spectrometer-On-A-Chip", Mar. 1995, from proceedings of American Physical Society, Mar. 1995 Meeting, San Jose, California.

Tuna et al., "Control of Mirror Position in a High Precision Interferometer", J. Phys. E. (6B), vol. 6, No. 2, Feb. 1973, pp. 169–170.

J. Jerman et al., "Minature Fabry–Perot Interferometers Micromachined in Silicon for use in Optical Fiber WDM Systems", 1991, pp. 372–375 from IEEE print 91CH2817-5/91/0000–0372.

Primary Examiner—Carolyn E. Fields
Assistant Examiner—Edward J. Glick
Attorney, Agent, or Firm—John G. Shudy, Jr.

[57] ABSTRACT

A monolithically constructed infrared, tunable Fabry-Perot cavity filter-detector for spectroscopic detection of particular substances having an absorption line in the wavelength range from 2 to 12 microns. The filter-detector has a hermetically sealed Fabry-Perot cavity that has a mirror which has an adjustable distance relative to another mirror of the cavity. The former mirror is adjusted by piezoelectric film on the mirror support or with piezoelectric stacks or wall supporting the mirror. There may be electrodes situated near the mirrors for capacitive sensing of the distance between the mirrors. Light to be filtered and detected comes in through a window wafer which may have diffractive or refractive microlenses, plus an optional spatial filter. After passing through the window wafer, the light is filtered by the tunable mirrors of the Fabry-Perot cavity. The portion of the light that is passed by the cavity is detected by an infrared microbolometer or a CCD array. The cavity and detector are hermetically sealed in a vacuum.

12 Claims, 25 Drawing Sheets

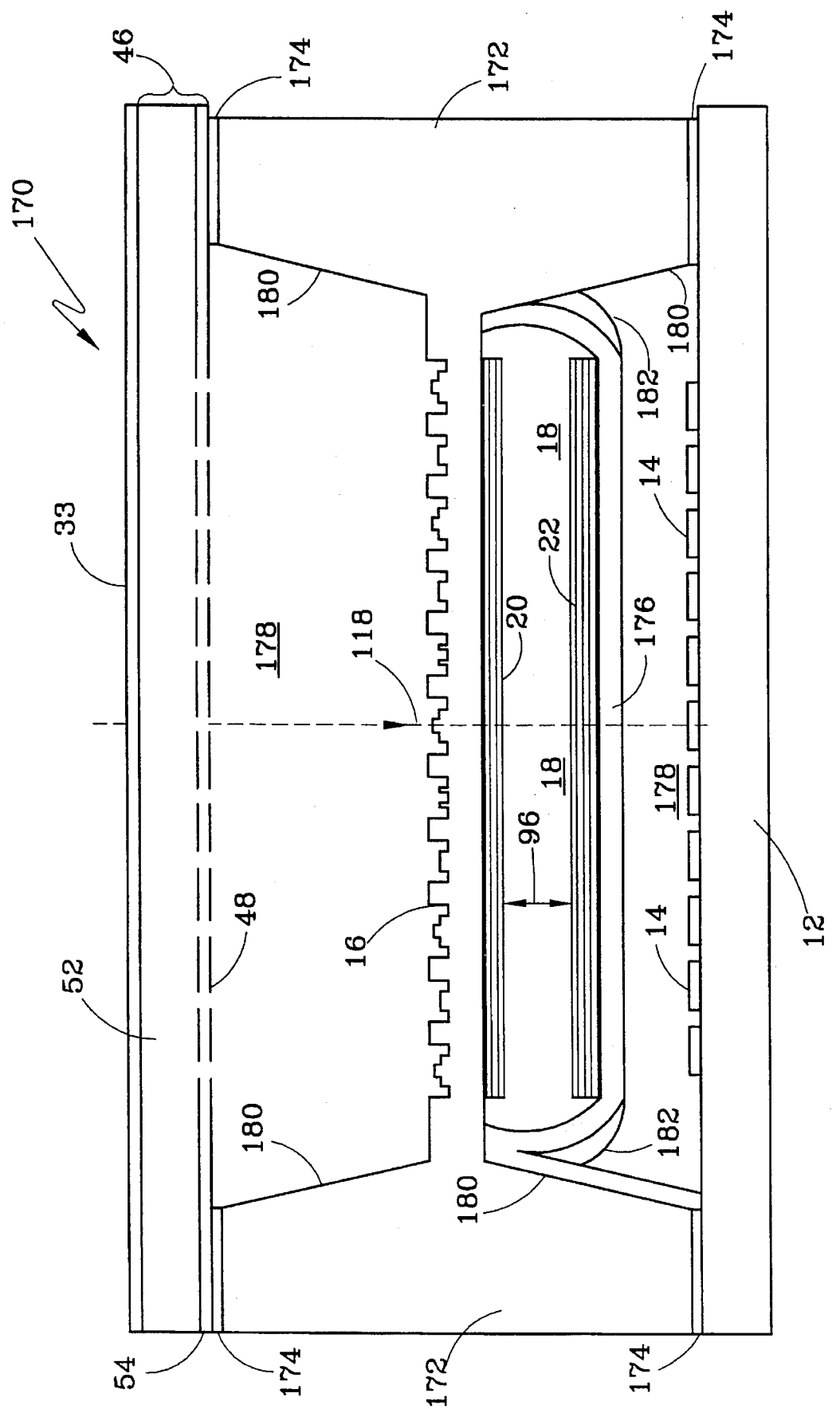

TRANSMITTANCE % VS. WAVELENGTH (um)

TRANSMITTANCE % VS. WAVELENGTH (um)

5,550,373

FABRY-PEROT MICRO FILTER-DETECTOR

BACKGROUND OF THE INVENTION

The present invention pertains to micro infrared (IR) detectors and particularly to micro IR filter type detectors. More particularly, the invention pertains to Fabry-Perot micro IR filter type detectors for spectroscopic imaging. The related art discloses Fabry-Perot cavities formed by micromachining on silicon wafers. In such art, wavelength trimming is achieved electrostatically with a variable voltage.

SUMMARY OF THE INVENTION

The present invention is an encapsulated tunable filter and detector primarily for detecting infrared radiation at specific wavelengths. The device has microlenses micromachined into a silicon wafer. A Fabry-Perot cavity is integrated onto the wafer. The cavity is tunable as one of the cavity mirrors is moveable with a piezoelectric thin film. A microbolometer or other detector array or pixel on another wafer together with the microlens wafer and the cavity, form an integrated vacuum package enclosing the detector and the cavity.

BRIEF DESCRIPTION OF THE DRAWING

FIG. 9b reveals a micro filter detector having silicon etch pits.

DESCRIPTION OF THE PREFERRED EMBODIMENT

Figure 1:
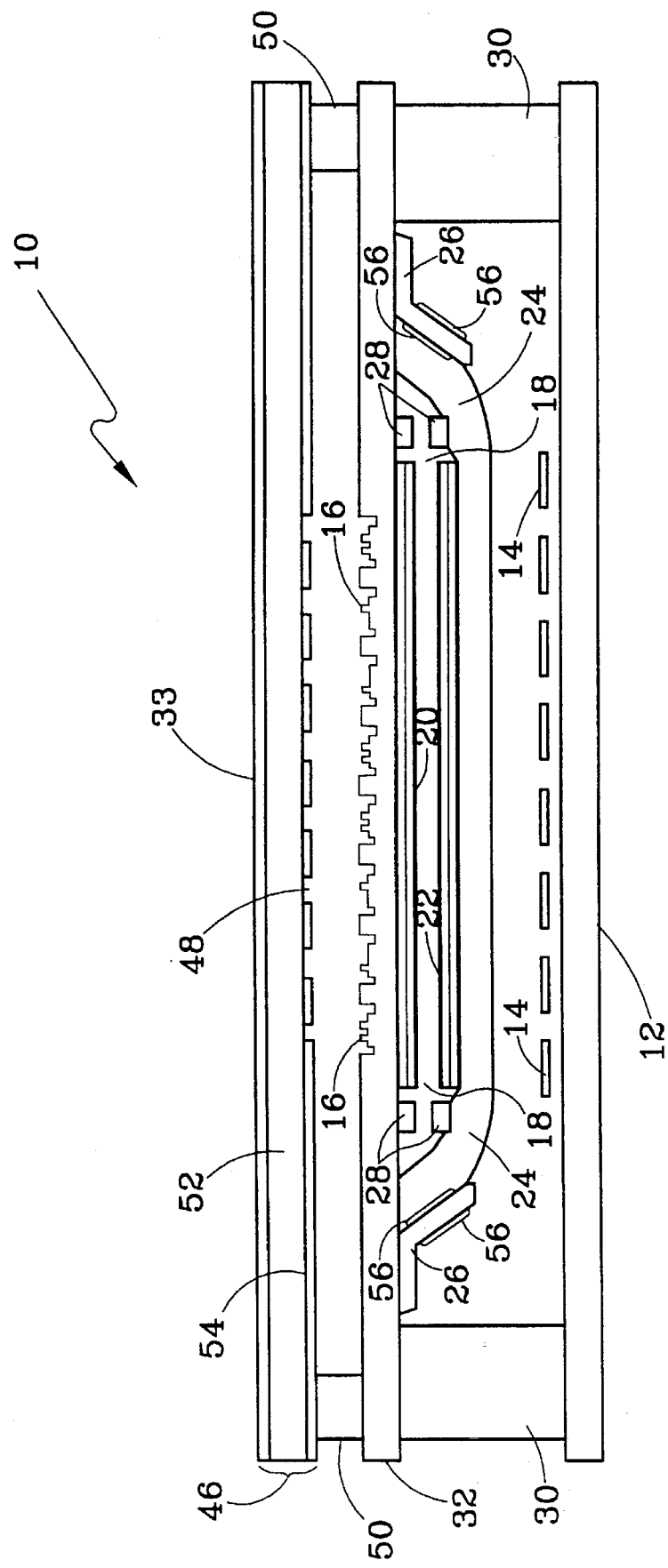
FIG. 1 shows a micro filter-detector having diffractive microlenses.

FIG. 1 shows a polysilicon, piezoelectric-actuated, infrared tunable, Fabry-Perot microfilter with integrated microlenses and detector for spectroscopic environmental monitoring. Situated on substrate 12 is a microbolometer detector 14 which may be a single pixel or an array of pixels. Device 10 consists of a silicon wafer with a microlens 16 and a Fabry-Perot cavity 18. Cavity 18 is a monolithic polysilicon Fabry-Perot microstructure having silicon dioxide/silicon ($SiO_2$/Si) mirrors 20 and 22. Polysilicon bridge 24 supports one mirror 22 of Fabry-Perot cavity 18. This support bridge 24 to layer 32 and can move bridge 24 and mirror 22 so as to provide the Fabry-Perot cavity 18 with tuning capabilities. Wafer 32 is vacuum sealed to bolometer detector 24 pixel 14 or array of pixels 14, with a continuous support 30 around the perimeter of wafers 20 and 32. Support 30 encloses microbolometer 12 and Fabry-Perot cavity 18 in a vacuum. Spatial filter 46 is situated proximate to microlenses 16. Filter 46 has a silicon layer 52 which functions as a window for IR light. On the bottom side of layer 52 is a thin metal film layer 54, such as chrome, nichrome or gold, which has a plurality of apertures 48, each of which have a diameter between 20 and 50 microns. Each aperture 48 is focused on a corresponding microlens 16. Apertures 48 function as a field stop to limit radiation to microlenses 16 from certain directions. Spatial filter 46 is supported on wafer 32 by posts 50. Posts 50 may constitute a ring around wafer 32 to provide a vacuum encapsulation of lenses 16 and apertures 48. The array of detectors 14 may be a microbolometer or other IR detector for IR light, or a CCD array for visible light in which case materials such as transparent silicon dioxide ($SiO_2$) or silicon nitride ($Si_3N_4$) would take place of the moveable polysilicon structure, and optical materials such as glass or sapphire would take the place of silicon substrate. Detectors 14 may be suspended pixels or formed in wafer 12. Detectors may be made from a variety of commonly used materials such as HgCdTe, PtSi or InSb. Related IR microbolometer technology is disclosed in several U.S. patents. U.S. Pat. No. 5,286,976, by B. Cole, issued Feb. 15, 1994, entitled "Microstructure Design for High IR Sensitivity," and assigned to the same assignee of the present application, is hereby incorporated by reference in this present patent application. U.S. Pat. No. 5,260,255, by M. Liu et al., issued Nov. 9, 1993, entitled "Integrated Infrared Sensitive Bolometers," and assigned to the same assignee of the present application, is hereby incorporated by reference in this present patent application. U.S. Pat. No. 5,401,968, issued Mar. 28, 1995, by J. Allen Cox, assigned to the same assignee of the present application, and discloses information related to a binary optical microlens detector array, is hereby incorporated by reference in this present patent application.

System 10 has thin film micromirrors 20 and 22 which are moveable relative to each other, thin film piezoelectric microactuators 26 for cavity 18 tuning, microlenses 16 for collimation of incoming light 30 and microstructure detector 12 and 14 to provide infrared (IR) sensing, thereby resulting in a virtual spectrometer on a die. Each diffractive microlens 16 may be unique or different from the remaining microlenses 16 in that the diffraction of light by each lens 16 is different from the others. Actuators 26 are activated with a voltage applied to actuator electrodes 56. As an actuators 26 expands or shrinks, it has a cantilever effect on the supporting portion of bridge 24 since it is adhered to the surface of that portion resulting in a bimorph effect such any change in size of actuator 26 is amplified in the actual movement of bridge 24. Piezoelectric actuators 26 fast in comparison to other types of actuators, such as thermal bimorphs. Device 10 incorporates monolithic tunable IR Fabry-Perot cavity 18 on a single silicon wafer. The structure, containing mirrors 20 and 22, piezoelectric (PZT) actuators 26 and capacitive sense electrodes 28 at the corners of filter 18 on bridge 24 and wafer 32, can be formed by growing films of polysilicon, $SiO_2$, $Si_3N_4$, and PZT, and using a sacrificial etch material on one silicon wafer rather than bonding two wafers together.

Capacitive sense electrodes 28 are implemented for sensing distance between mirrors 20 and 22. As electrodes 28 approach each other, the capacitance between the electrodes increase thereby providing an indication of distance between mirrors of the Fabry-Perot cavity. Electrodes 28 may act as a physical stop for a minimum distance between mirrors 20 and 22, which is an indication of maximum capacitance or an electrical connection or shot between the pairs of electrodes 28.

Making the device monolithic allows tighter control of the critical Fabry-Perot gap spacing which is on the order of 0.1 to 2 micrometers, comparable to the present bolometer gap spacings. Array 14 of elements is vacuum sealed to a silicon wafer as a tunable window for an IR detector in an integral vacuum package. Lenses 16, which are designed to collimate light through cavity 18, can be fabricated in registry with Fabry-Perot cavity 18. This sort of fabrication is a benefit if a number of smaller cavities 18 is to be used. Fabry-Perot cavity 18, formed on a silicon wafer with $SiO_2$/Si mirrors, can be tuned over the mid-wave infrared (MWIR) from 2.5 to 5.5 microns band where atmospheric gases have absorption, by changing the gap through a range of distances between 0.2 to 2.3 micrometers. Fabry-Perot cavity 18 also can tune over from 8 to 12 micrometers with appropriate changes in the gap of cavity 18. One may even tune over visible light as well, by using mirrors 20 and 22 made from $SiO_2$/$ZrO_2$ on $Si_3N_4$ film microstructures on glass substrates, and visible-light transparent wafers.

Figure 2:
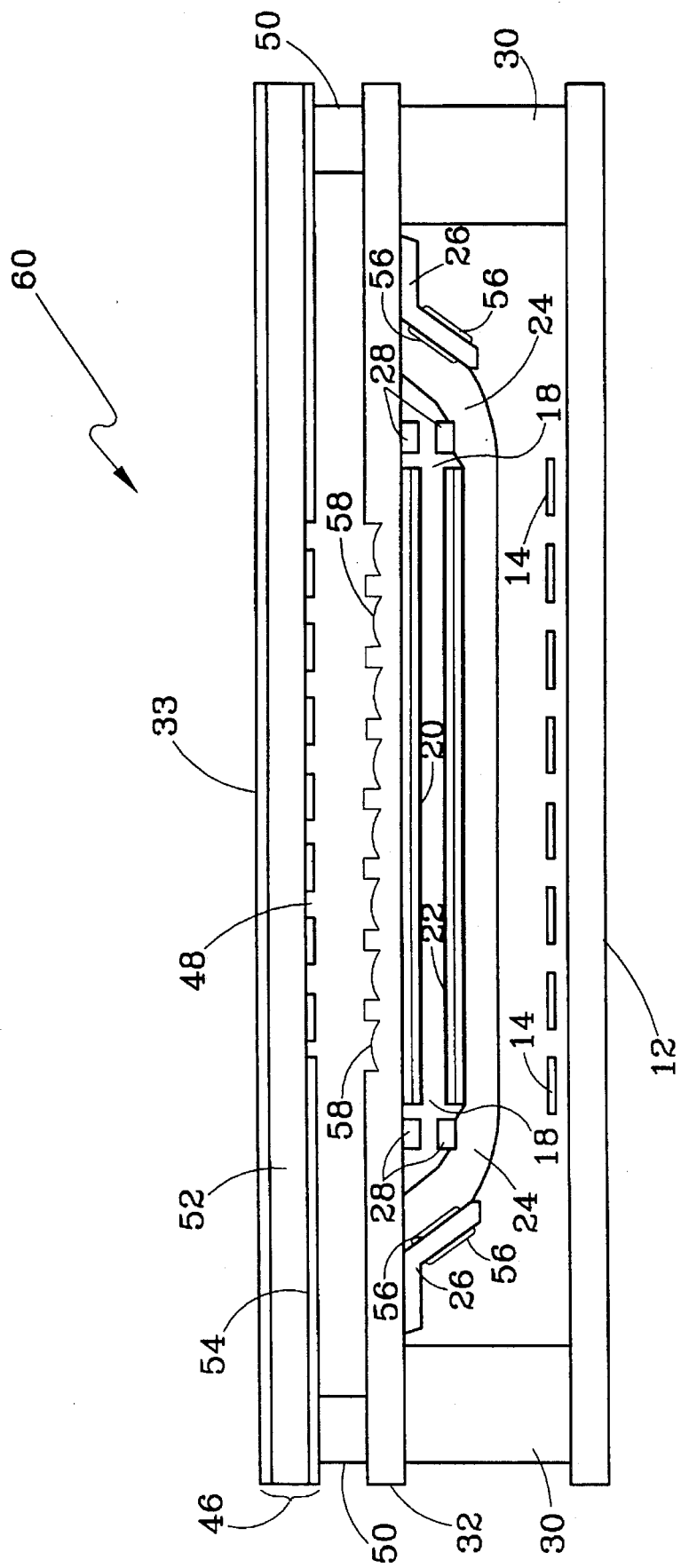
FIG. 2 shows the micro filter-detector having refractive microlenses.

FIG. 2 shows a device 60 that resembles device 10 of FIG. 1 except in lieu of diffractive lenses 16 there are refractive lenses 58. Each refractive microlens 58 may be different from any other refractive lens 58 in that it may refract light differently from the others. Diffractive microlenses 16 and refractive microlenses 58 may be fabricated with binary optical features.

Figure 3:
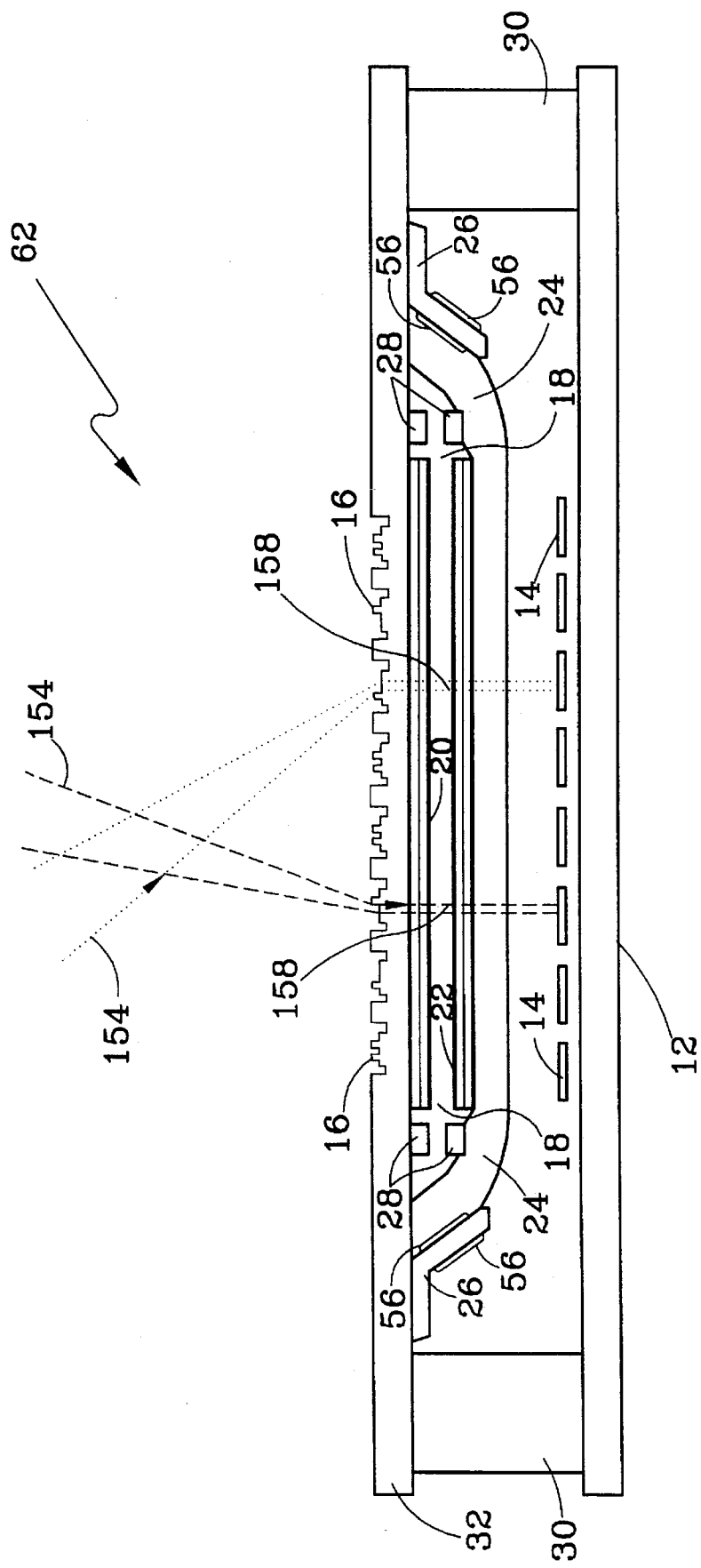
FIG. 3 shows the micro filter-detector without the spatial filter.
Figure 4:
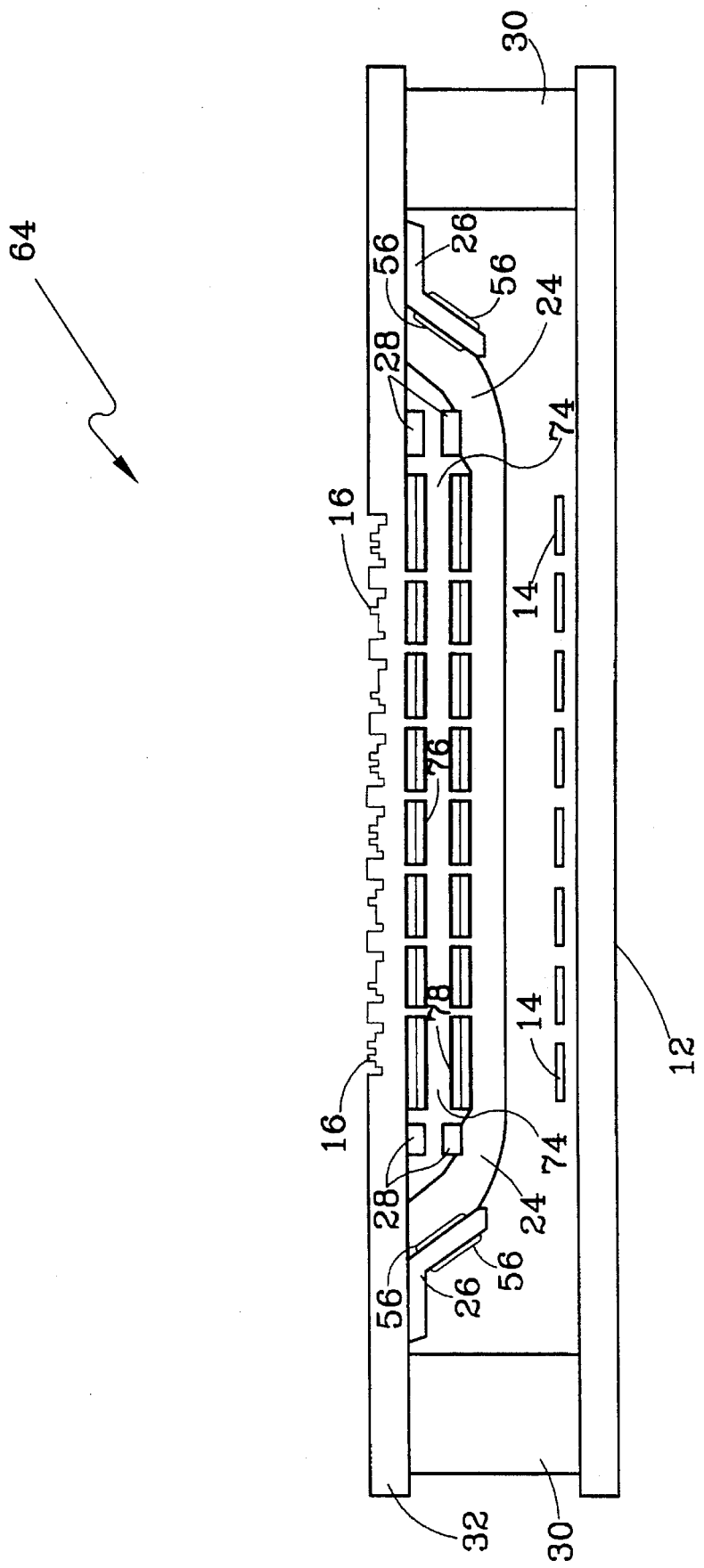
FIG. 4 shows a micro filter-detector having a multitude of Fabry-Perot cavities.

FIG. 3 shows a device 62 like that of device 10 of FIG. 1 except device 62 does not have a spatial filter 46. FIG. 4 shows a device 64 like that of device 62 of FIG. 3 except that device 64 has a multitude of Fabry-Perot filters 74 in lieu of a single Fabry-Perot filter 18. An individual filter 74 is situated between each microlens 16 and detector 74. Each filter 74 has a pair of mirrors 76 and 78. The distances between mirrors 76 and 78 of each filter 74 may be different from those of the remaining filters 74. Thus, each filter 74 may have a high transmittance for different wavelength and be tuned for detecting a variety of radiation on respective detectors 14.

Figure 11:
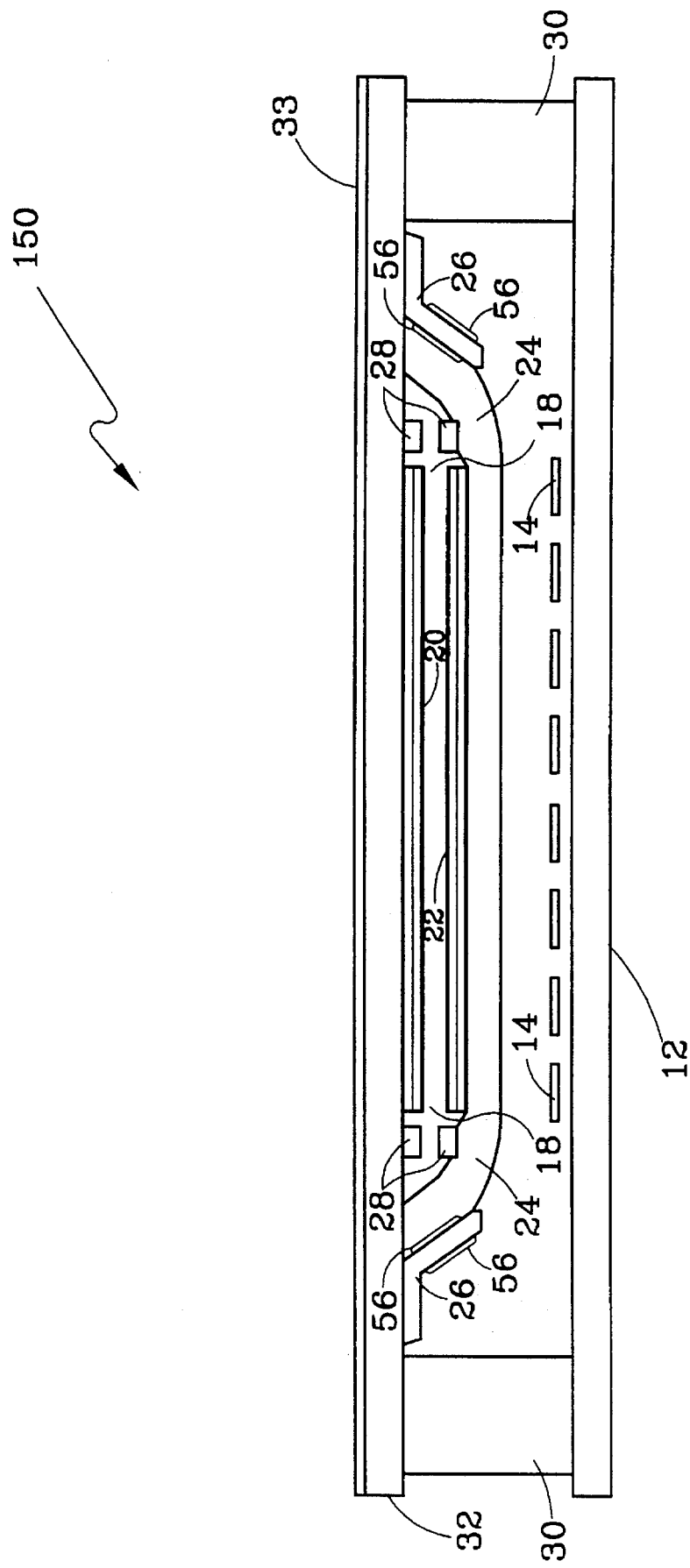
FIG. 11 illustrates a micro filter-detector without a microlens.

The devices in FIGS. 1–4 may be used without microlenses or a lens and merely have a window 32 as in device 150 which is illustrated in FIG. 11. Any light receiving surface such as window 32 would be coated with an antireflection (AR) film 33 to avoid such things as silicon reflection. All surfaces of layers for receiving light, except those for mirrors would have an AR coating.

Figure 5:
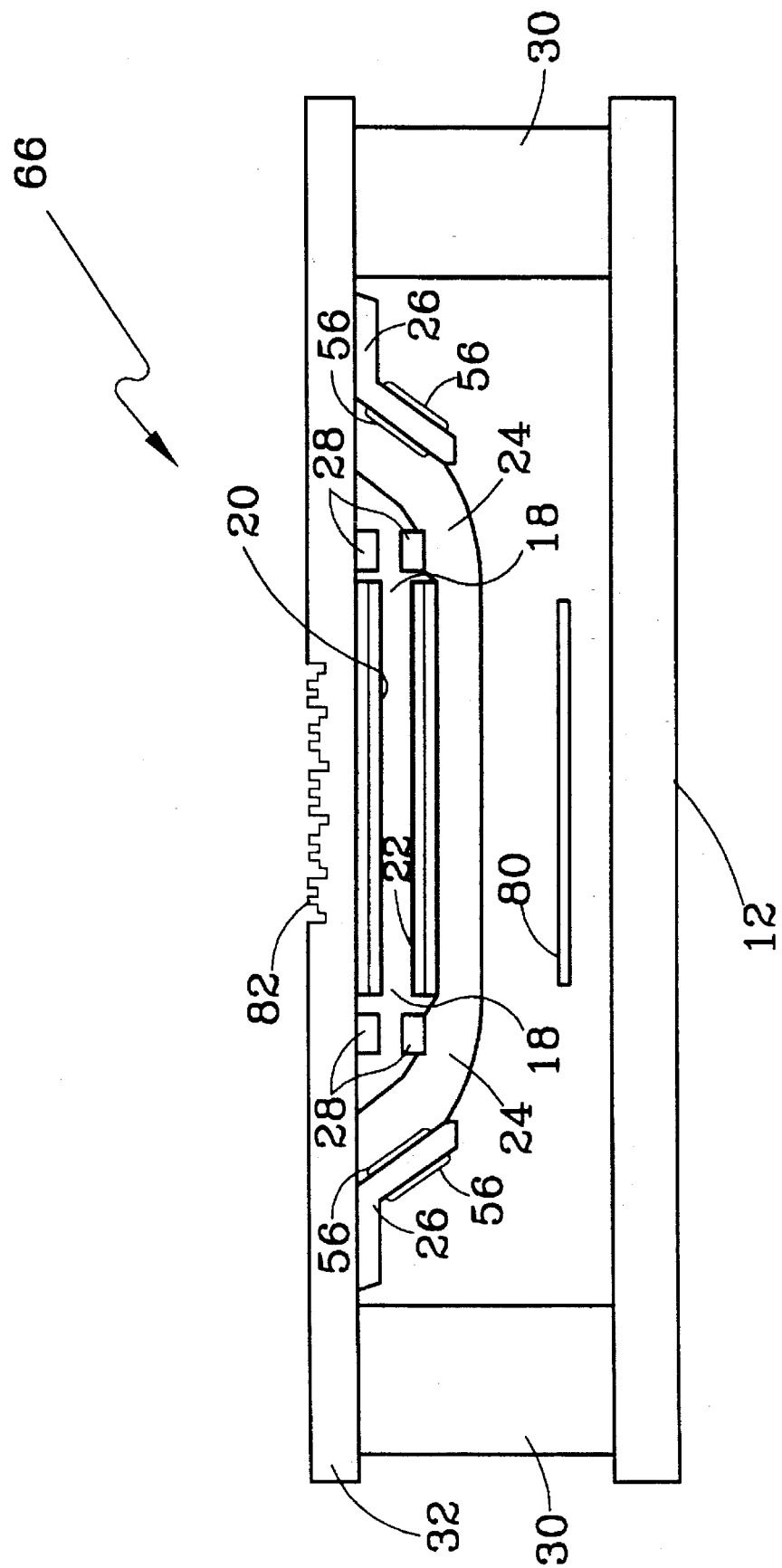
FIG. 5 shows a micro filter-detector having a one diffractive lens and detector.
Figure 6:
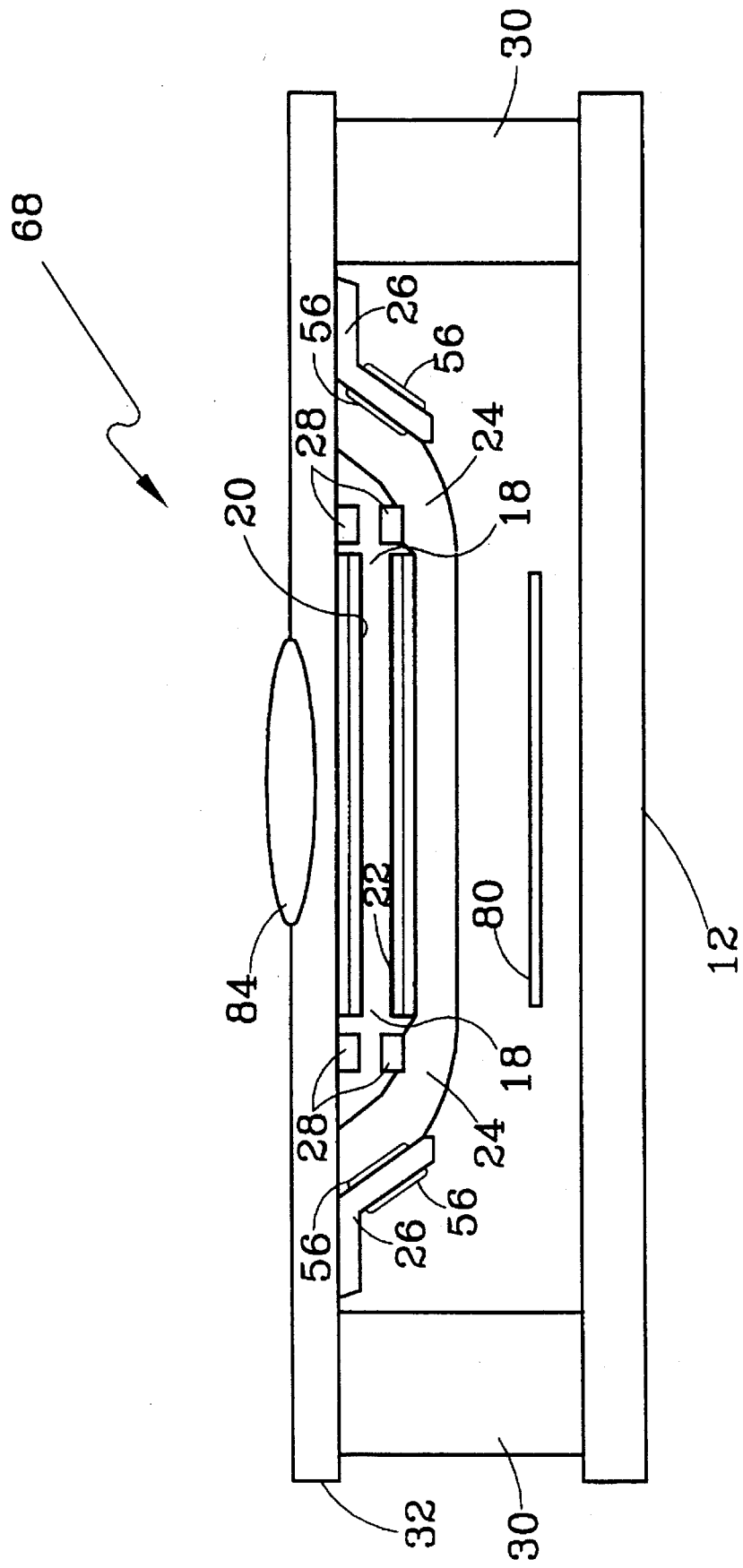
FIG. 6 shows a micro filter-detector having a one refractive lens and detector.

FIG. 5 shows a device 66 that is similar to detector 62 of FIG. 3 except that there is only one detector 80 in lieu of the array of detectors 14. In place of the array of microlenses 16 is one diffractive microlens 82 approximately over the area of detector 80. Device 68 of FIG. 6 is similar to device 66 of FIG. 5 except that device 68 has a single refractive lens 84 in lieu of diffractive lens 82. Devices 66 and 68 would need a high f number to function effectively.

Figure 7:
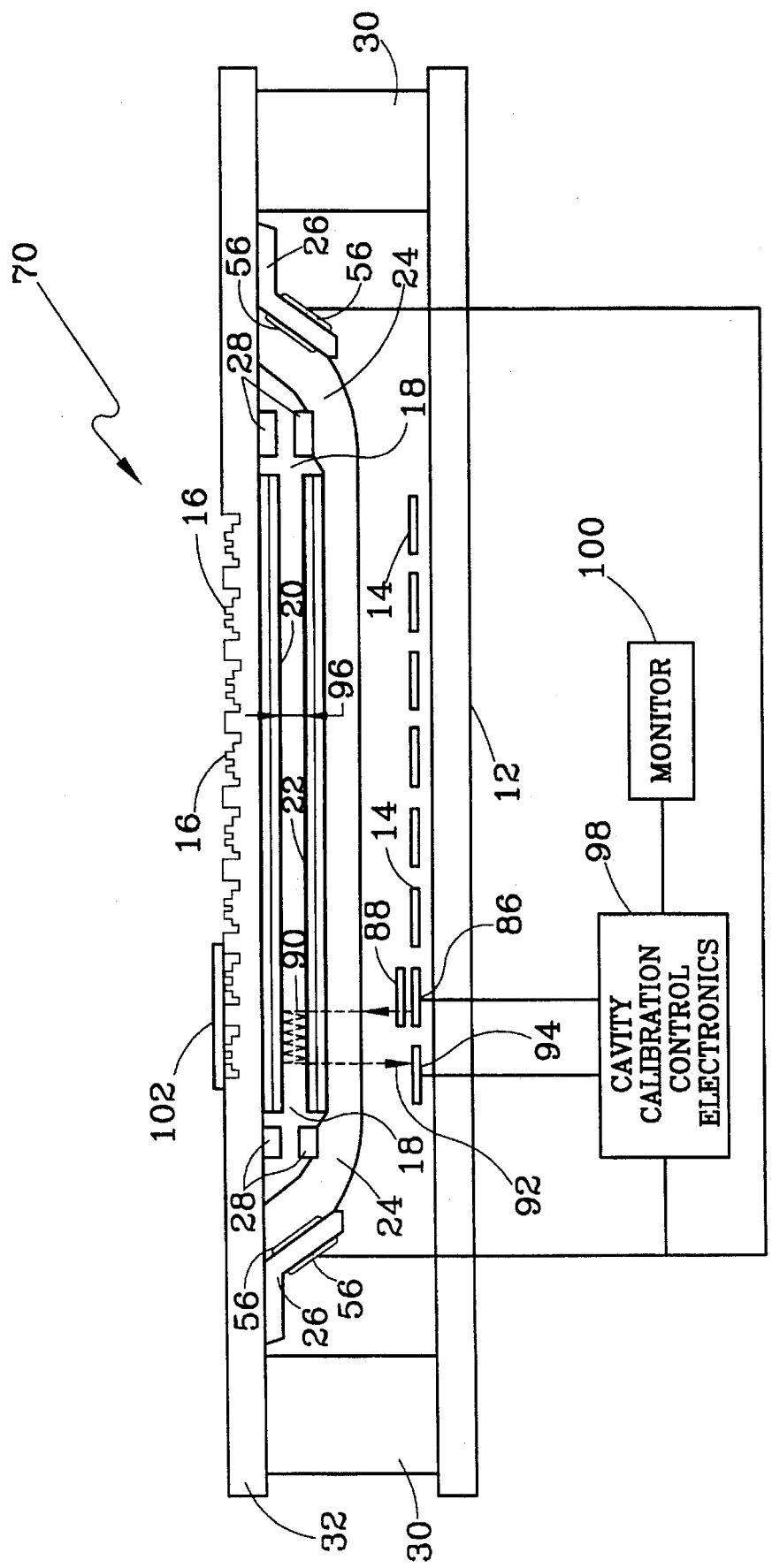
FIG. 7 shows a micro filter-detector having an internal cavity calibration source and detector.

Device 70 of FIG. 7 is like device 62 of FIG. 3 except that device 70 has an internal reference source 86 of radiation or micro-emitter which may be a laser light source such as a laser diode. A transmittance filter 88 or narrow band filter may be used to filter the light or radiation from source 86 to provide a source of light 90 having a sufficiently narrow frequency band for reference and filter 18 calibration purposes. Light 90 is reflected by mirrors 20 and 22 of filter 18 and may be reflected out as light 92 to detector 94, provided that distance 96 between mirrors is such that filter 18 is tuned to pass a maximum amount of light at the frequency of reference light 90. If distance 96 is not optimal for passing light 90 out as a maximum intensity filtered light signal 92, then cavity calibration control electronics 98 provides a feedback signal to electrodes 56 on piezoelectric actuators 26 so as to move mirror 22 on bridge 24 relative to mirror 20 to a distance which maximizes the intensity of light 92 impinging detector 94 and consequently the electrical signal for detector 94 to electronics 98. Thus, distance 96 between mirrors 20 and 22 is kept at an optimum level during temperature variations and other environmental effects of device 70. Monitor 100 may be used to observe and adjust the cavity calibration system. A light shield 102 is placed over the microlenses in the area of the calibration light activity so as to prevent interference of external ambient light with light signals 90 and 92, and with the calibration and cavity adjustment activity. Emitters 86 and detectors 94 could be located at the corners of the array of the device. System 70 may have a plurality of reference light sources 86 and filters 88 of different wavelengths so that Fabry-Perot cavity 18 may be tuned for various wavelengths upon selection. This calibration system also may be applied to device 64 in FIG. 4, for instance, in calibrating or tuning each of Fabry-Perot cavities 74 to a different wavelength, respectively.

Figure 8:
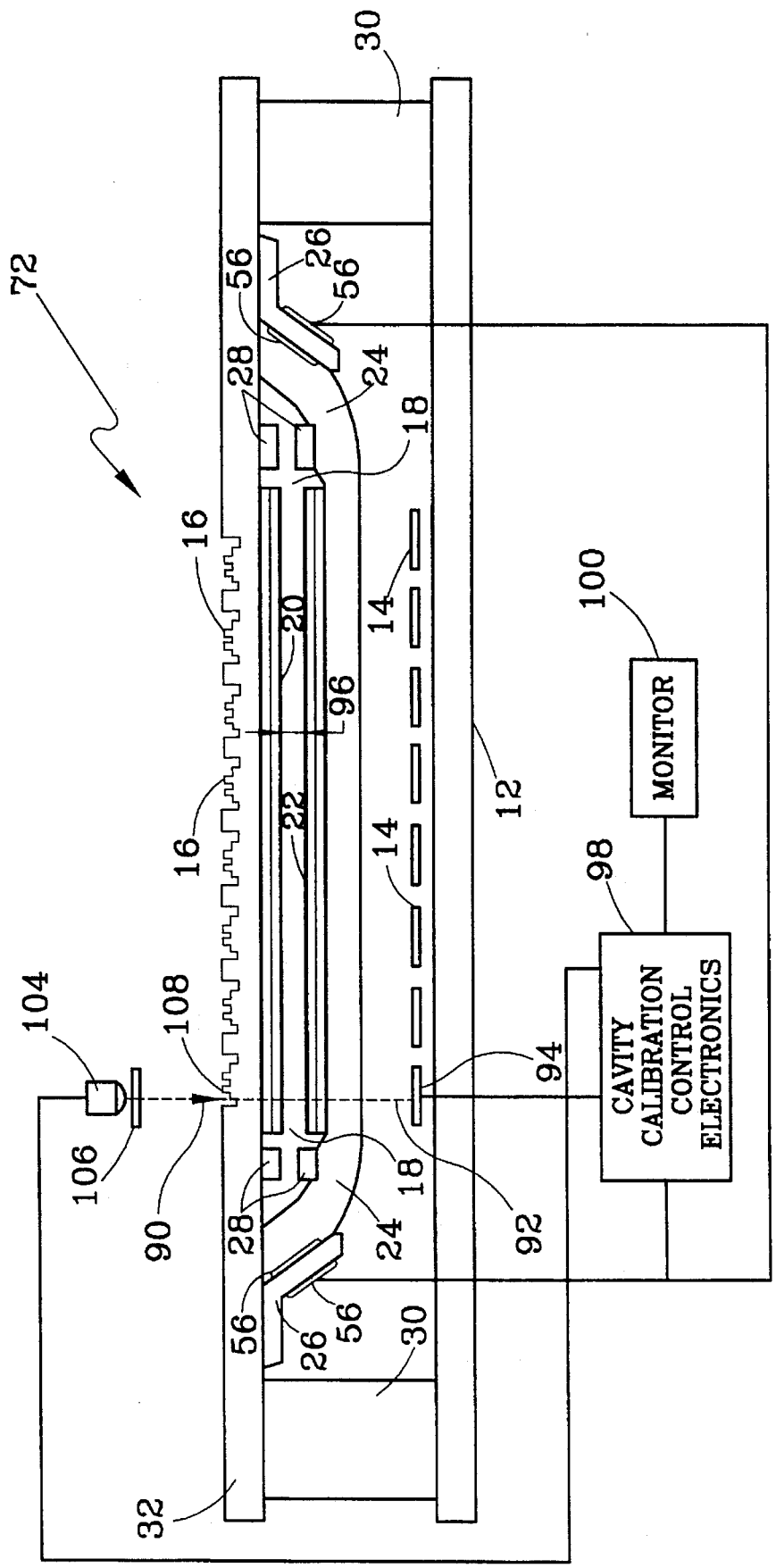
FIG. 8 shows an external calibration setup for the micro filter-detector.

FIG. 8 shows a device 72 which is similar to device 70 of FIG. 7, except that there is a calibration light source 104 external to the monolithic microfilter detector. A transmittance filter 106 may be placed at the output of source 104 as needed. Light 90 passes through microlens 108, mirrors 20 and 22 of Fabry-Perot filter 18, out of filter 18 as light 92, if filter 18 is sufficiently tuned to pass light 92, and onto detector 94. Control electronics 98 adjusts distance 96 between mirrors 20 and 22 via a signal to electrodes 56 of piezoelectric thin film actuators 26 that move bridge 24 and mirror 22 relative to mirror 20 to maximize the intensity of light 92. Cavity calibration electronics 98 and monitor 100 of device 72 function similarly to that of device 70 in FIG. 7. Likewise, device 72 of FIG. 8 may use a plurality of reference light sources 104 and filters 106 for emitting light at different wavelengths to detector 94 or different detectors 14 so that Fabry-Perot cavity 18 can be selectively tuned for various wavelengths. This calibration and tuning system may be applied to device 60 in FIG. 4.

Figure 9A:
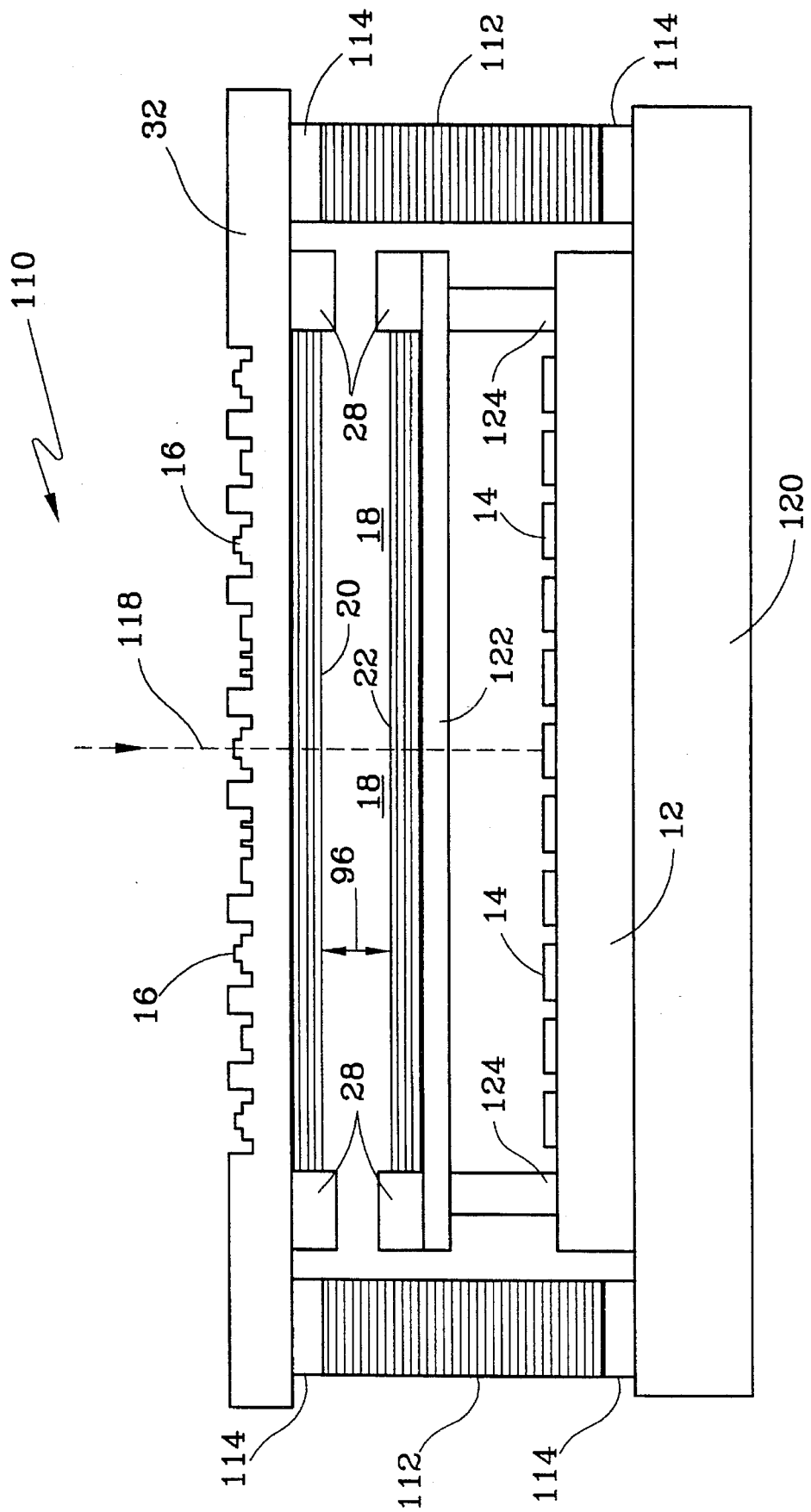
FIG. 9a shows a micro filter-detector having piezoelectric stacks for Fabry-Perot cavity tuning.

FIG. 9a reveals a device 110 that utilizes piezoelectric stacks 112 on electrodes 114 for adjusting distance 96 between mirrors 20 and 22 of Fabry-Perot filter 18. Capacitive electrodes 28 may be used to sense distance 96. Device 110 may incorporate cavity calibration control electronics 98 and the associated system of devices 70 or 72 in FIGS. 7 and 8, respectively. Light 118 comes through microlens 16 into filter 18. If light 118 is of the appropriate wavelength for filter 18, it will pass through filter 18 onto detector 14. The lenses on wafer 32 may be diffractive microlenses 16, refractive microlenses, or a single diffractive or refractive lens. The array of detectors 14 on wafer 12 may be substituted with a single detector. Also, device 110 may be built with materials and dimensions to function at wavelengths other than IR, such as visible light. Mirror 22 is formed on a wafer 122 which is supported by posts 124 on wafer 12 containing the array of detectors 14. Piezoelectric stacks 112 with electrodes 114 are formed on wafer 120. Stacks 112 and electrodes 114 may form a ring between wafers 32 and 120 to form a wall that hermetically vacuum seals filter 18 and detectors 14. Device 110 of FIG. 9a may incorporate Fabry-Perot cavity calibration systems the same as those disclosed in FIGS. 7 and 8.

FIG. 9b reveals a filter-detector 170 having microlenses 16 formed or micromachined on a wafer 172 made of silicon etch pits 180. Silicon wafer 12 is bonded or soldered to wafer 172 at areas 174. Spatial filter 54 or, if there is no spatial filter, wafer 52 is bonded or soldered to wafer 172 at areas 174. In essence, device 170 structurally has three wafers 52, 172 and 12 soldered or bonded together with spacings 178 and 18 defined by silicon etch pits 180. Bridge 176 supports adjustable mirror 22. Piezoelectric actuators 182 provide the movement for adjusting gap 96 of Fabry-Perot cavity 18. The other numbered components are similar to like-numbered components of other devices disclosed in the present description.

Figure 10A:
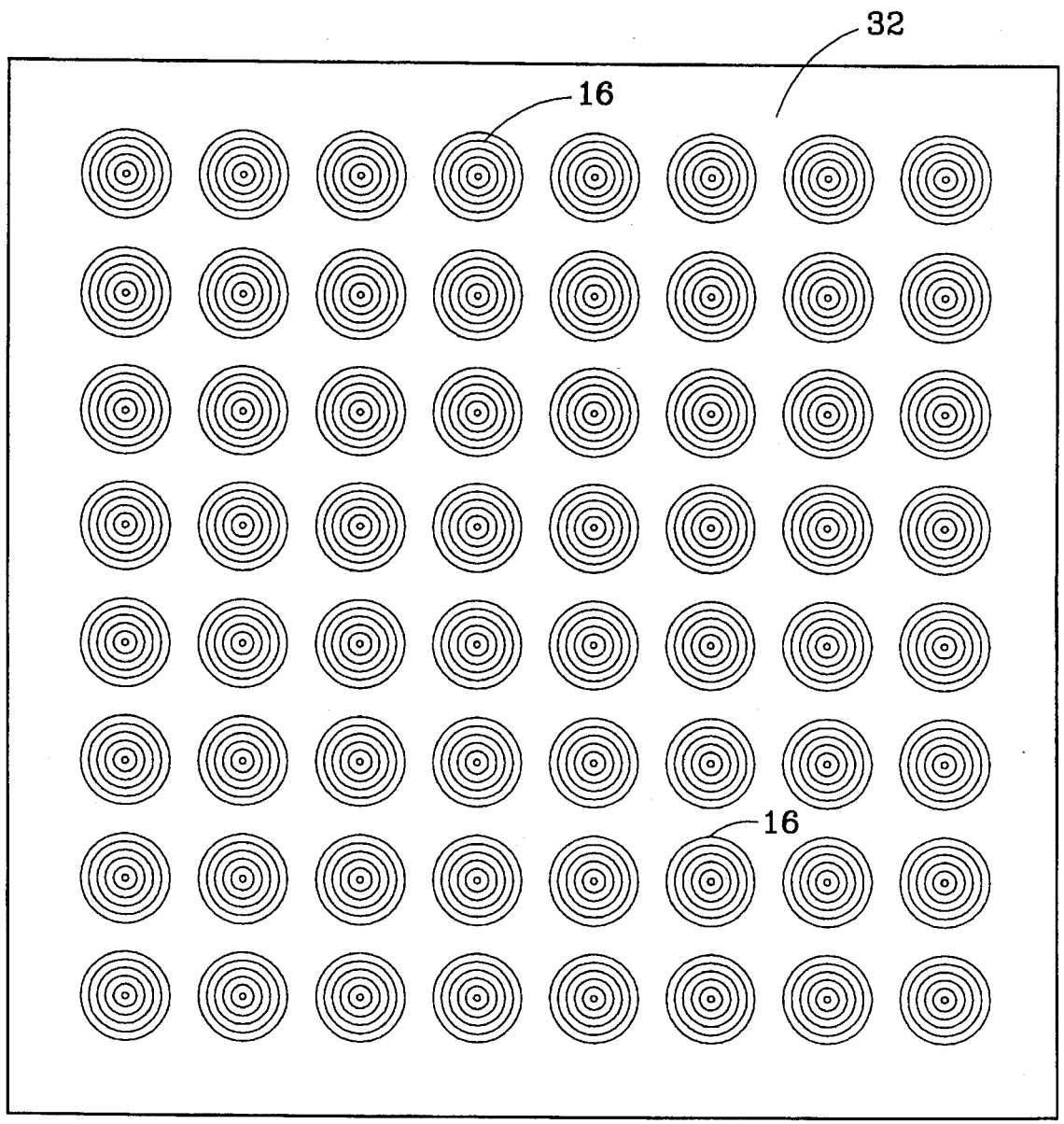
FIGS. 10a, 10b and 10c illustrate a microlens array, a detector array and a spatial filter, respectively.
Figure 10B:
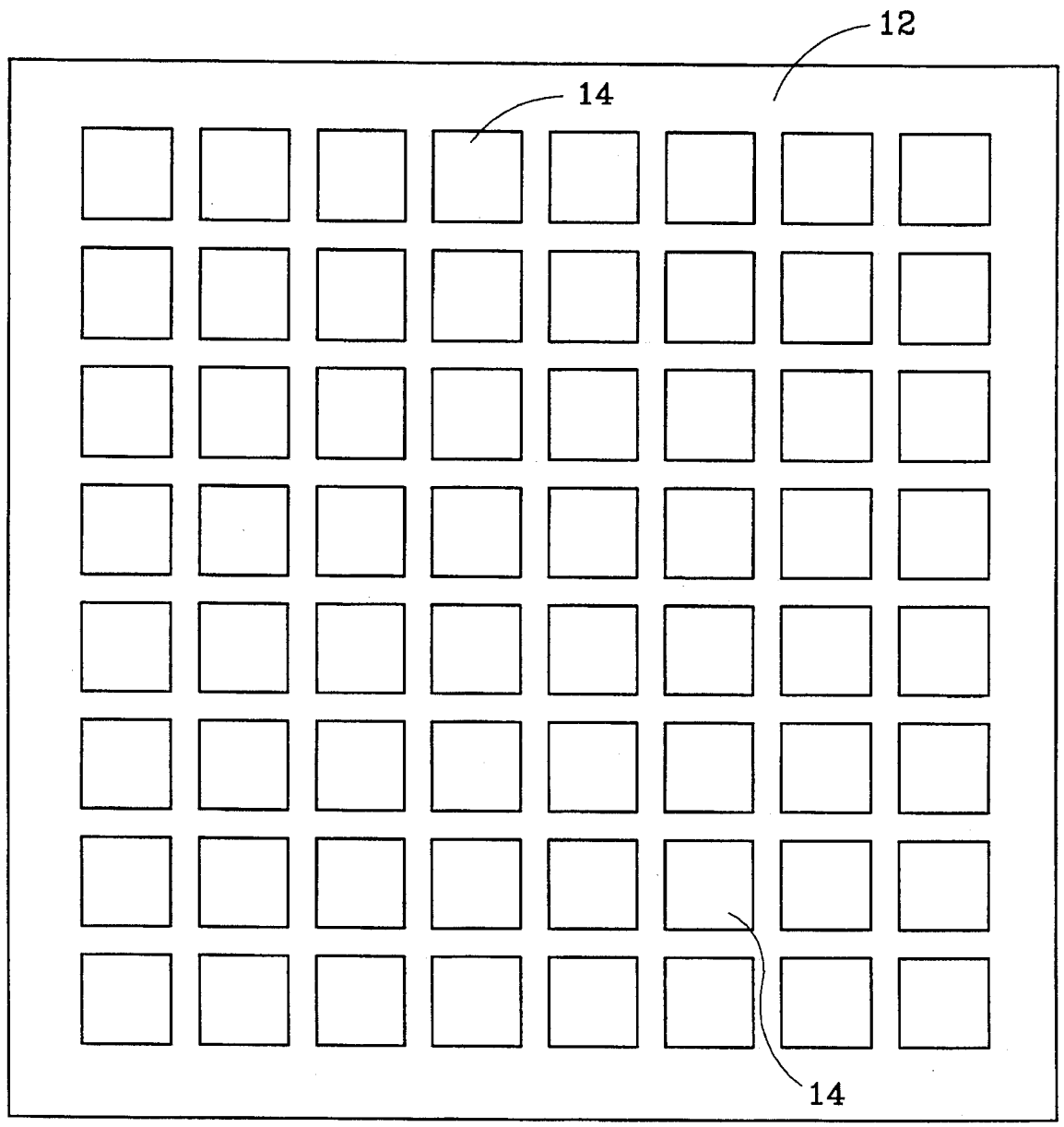
Figure 10C:
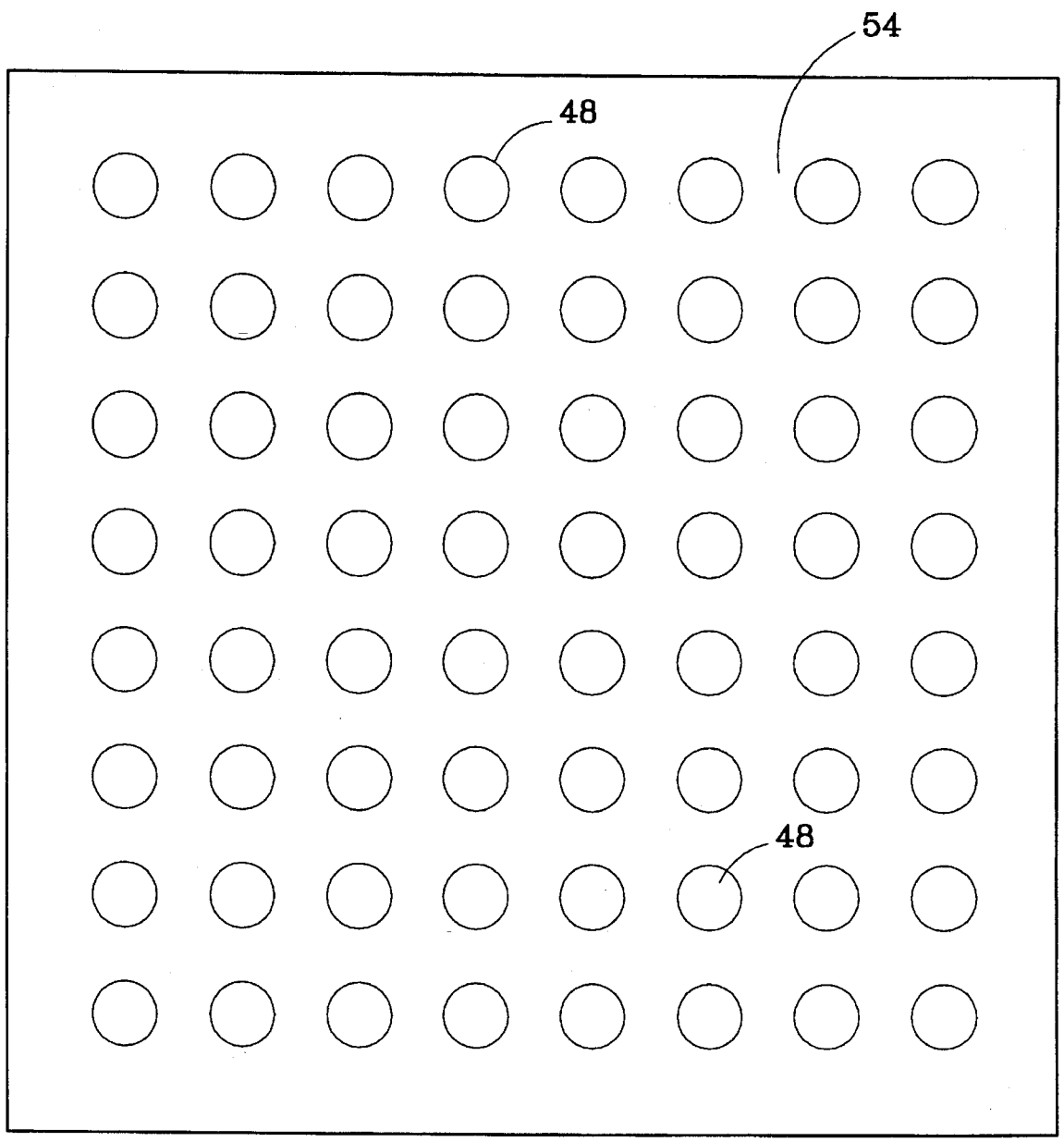

FIG. 10a illustrates an array of microlenses 16 on wafer 32. FIG. 10b shows an array of detectors 14 on substrate 12. FIG. 10c reveals a spatial filter 54 having apertures 48.

Figure 12A:
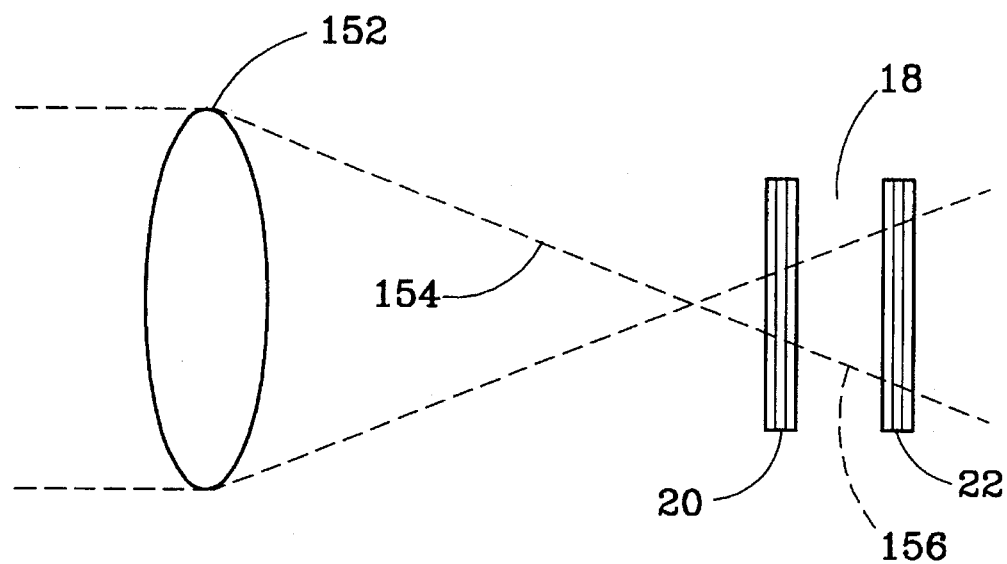
FIGS. 12a–12f reveal the effect of a microlens and a spatial filter on light entering the Fabry-Perot cavity.
Figure 12B:
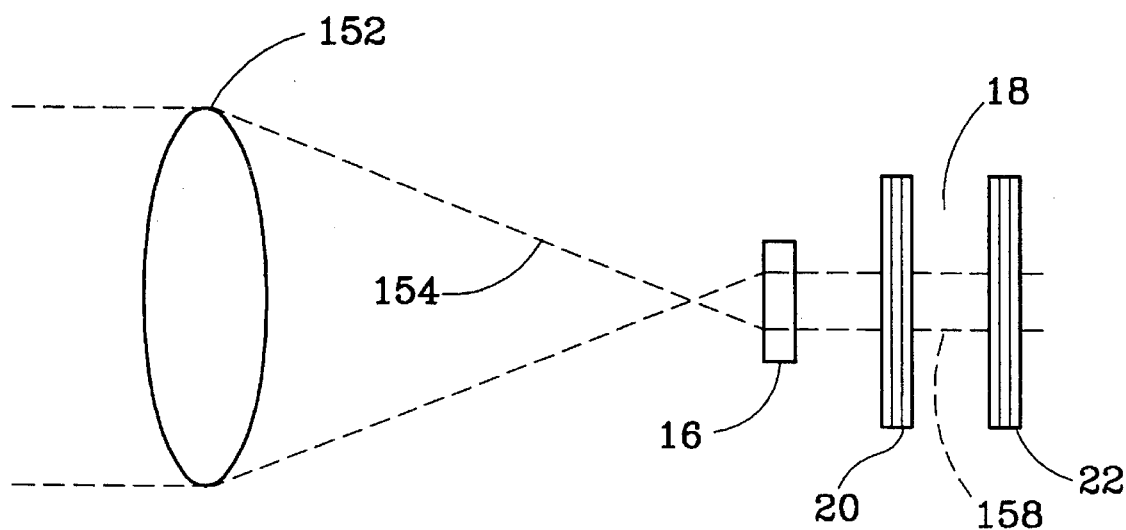
Figure 12C:
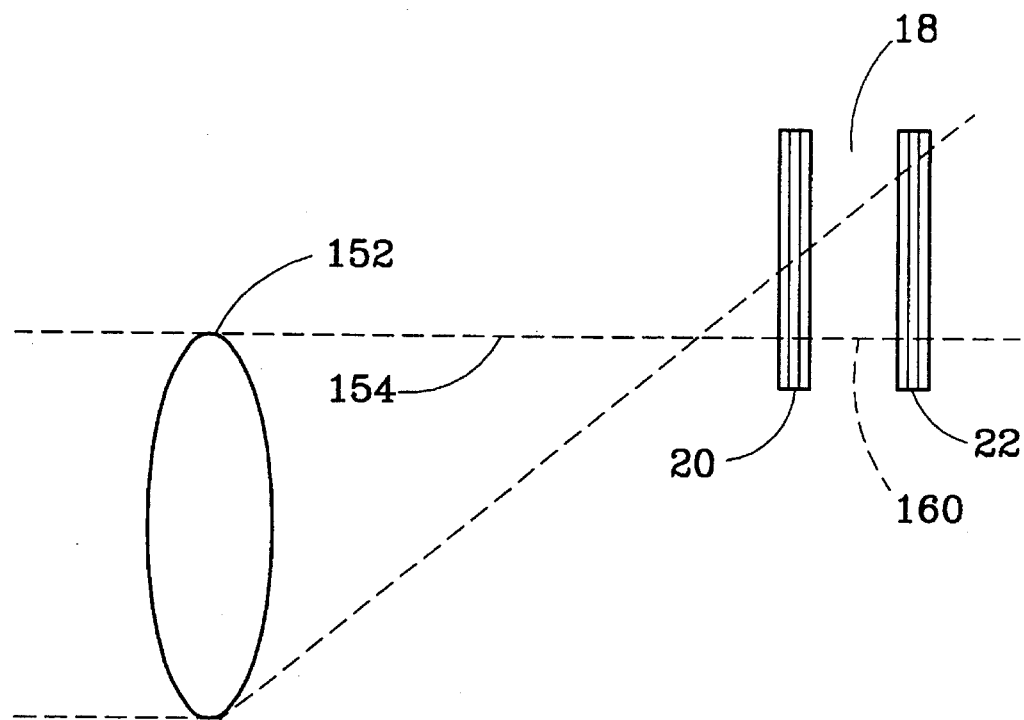
Figure 12D:
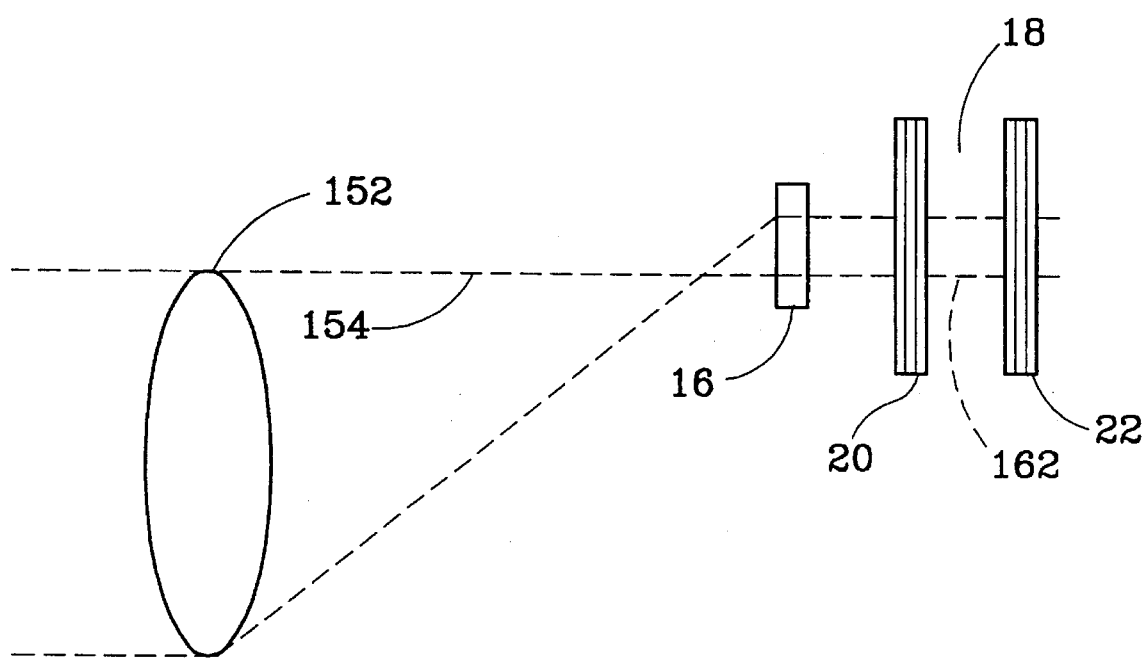
Figure 12E:
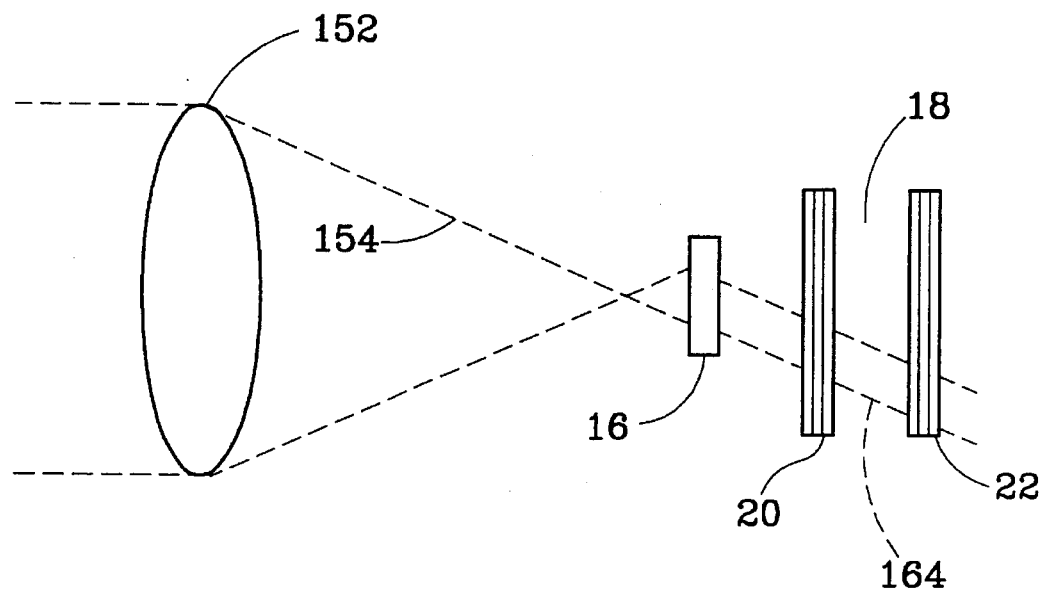
Figure 12F:
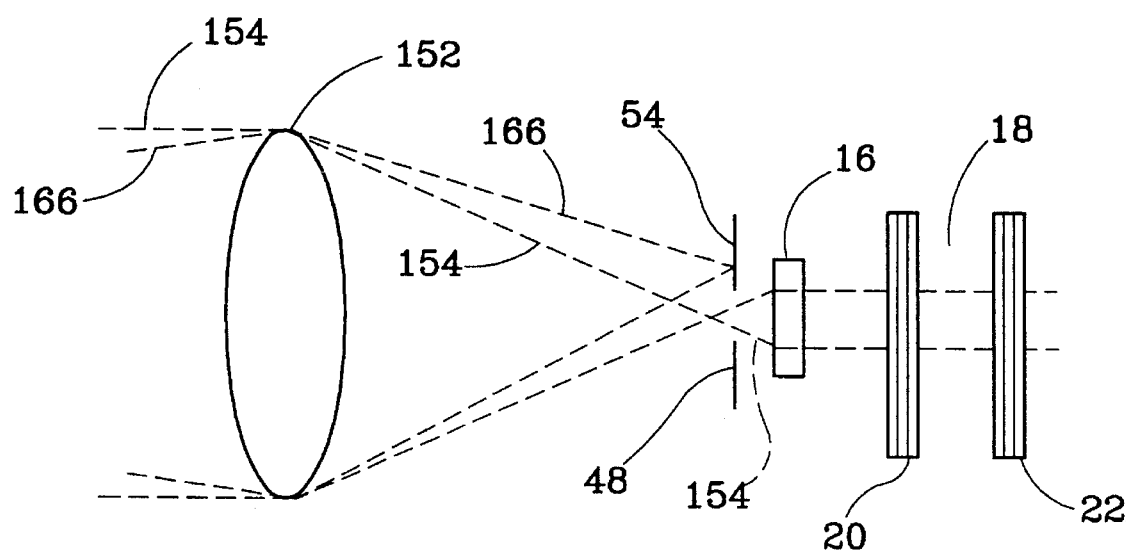

FIGS. 12a and 12b show the cone angles of light in the Fabry-Perot cavity 18 without and with microlenses, respectively. Light 154 comes through macro (fore) optics 152, and goes on through mirror 20, cavity 18 and mirror 22 as light 156, in FIG. 12a. In FIG. 12b, light 154 comes through optics 152, and goes on through microlens 16, mirror 20, cavity 18 and mirror 22 as light 158. Note that microlens 16 passed light 158 has a much less coning angle than light 156 not having passed through a microlens. This effect also is illustrated in FIG. 3. FIG. 12c shows an off-axis field point without microlenses 16. The result is a large cone angle of light 160 in Fabry-Perot cavity 18. FIG. 12d reveals an off-axis field point with microlenses 16. The result is a reduced cone angle of light 162 in Fabry-Perot cavity 18. FIG. 12e shows a subpixel off-axis field point with microlenses 16 and without spatial filter 54 with a resulting large wavefront angle of light 164 in Fabry-Perot cavity 18. FIG. 12f reveals the results of light 154 of a pixel on-axis field point and light 166 of a subpixel off-axis field point with spatial filter 54 having aperture 48. Light 166 of subpixel off-axis field points is blocked, and light 154 of pixel on-axis field points passes through aperture 48 of spatial filter 54.

Figure 13A:
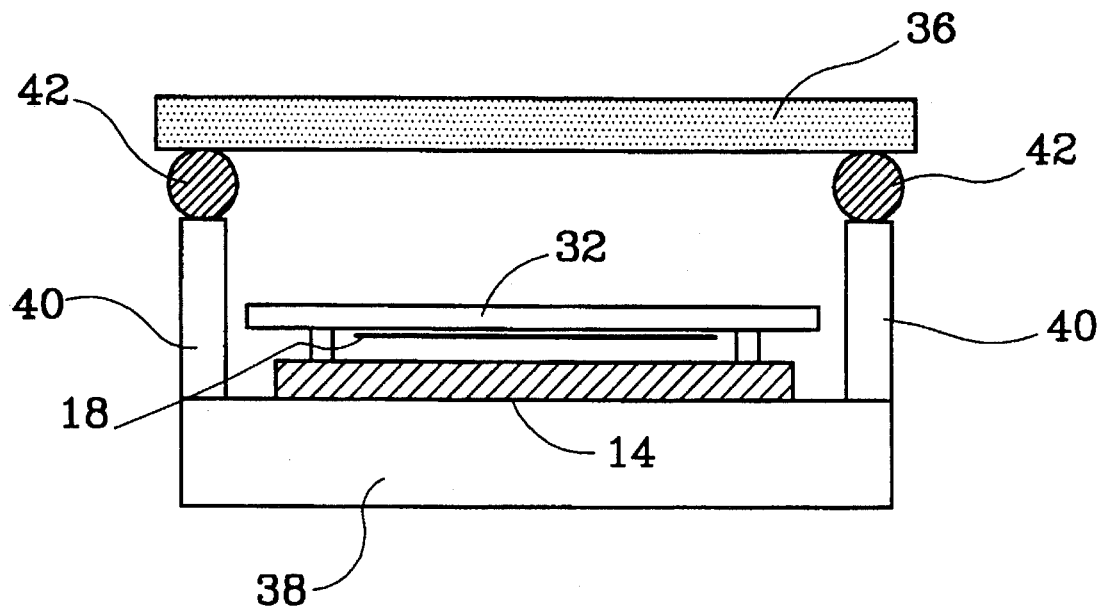
FIGS. 13a and 13b of the microfilter illustrate packaging schemes.
Figure 13B:
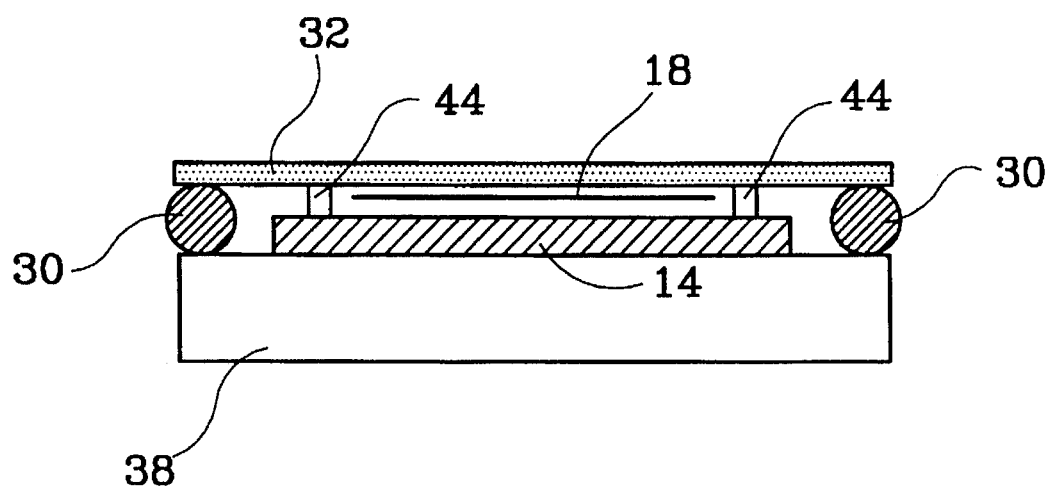

Integrating Fabry-Perot cavity 18 with detectors 12 and 14 results in a spectrometer on a chip. The Fabry-Perot cavity 18 silicon wafer may serve as an integrated vacuum window 32 on a detector array or detector element 14 with posts 34 supporting window 32 and cavity 18 relative to array or element 14. This device containing window 32, cavity 18 and array 14 is contained within a package consisting of package window 36, array 14 support 38, containing wall 40 and border seal 42 for containing the spectrometer within the container having a vacuum, is shown in FIG. 13a. FIG. 13b shows an alternative wherein Fabry-Perot cavity 18 is bonded to detector 14 using posts 44 which also make electrical connections to actuate the Fabry-Perot cavity 18 silicon wafer 32 that serves as a window integrated with cavity 18 and also serves as a package window and sealing support 30 for maintaining the vacuum for cavity 18 and array 14, which eliminates squeeze film damping and provides for improved bolometer operation. Here, the package is integrated with cavity 18.

The integration of microlenses 16 with the structures in FIGS. 13a and 13b, results in performance greater than that which can be achieved with macroscopic Fabry-Perot cavities. The problem with Fabry-Perot cavities utilizing macro type lenses is that light entering cavity 18 at different angles is detuned off from the design bandpass frequency. When cavity 18 operates over a finite field of view, resolution is degraded due to the various field points passing through the cavity at various angles. A solution to this problem is to operate with a narrow field of view or a reduced spectroresolution. The present solution to this problem uses microlenses 16 to collimate the light from various field points through the cavity and to preserve the resolution even when a large field of view is used. Microlens 16 must be designed for a detector 14 pitch and microlenses 16 have the capability to collimate light at the pixel thereby resulting in the use of a finite field of view and the achievement of high-wavelength resolution, which was not possible with macroscopic Fabry-Perot cavities.

Figure 14A:
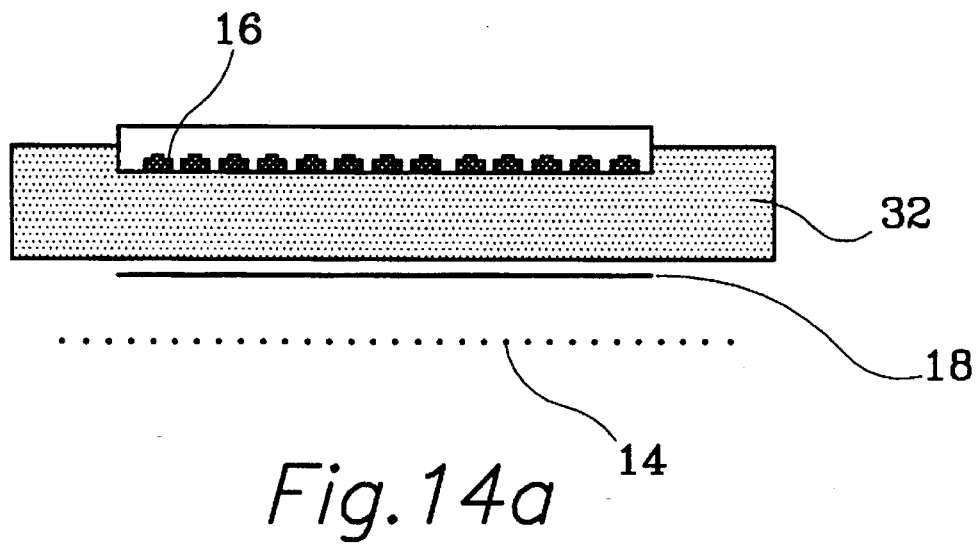
FIGS. 14a and 14b show two implementations of integrated microlenses.
Figure 14B:
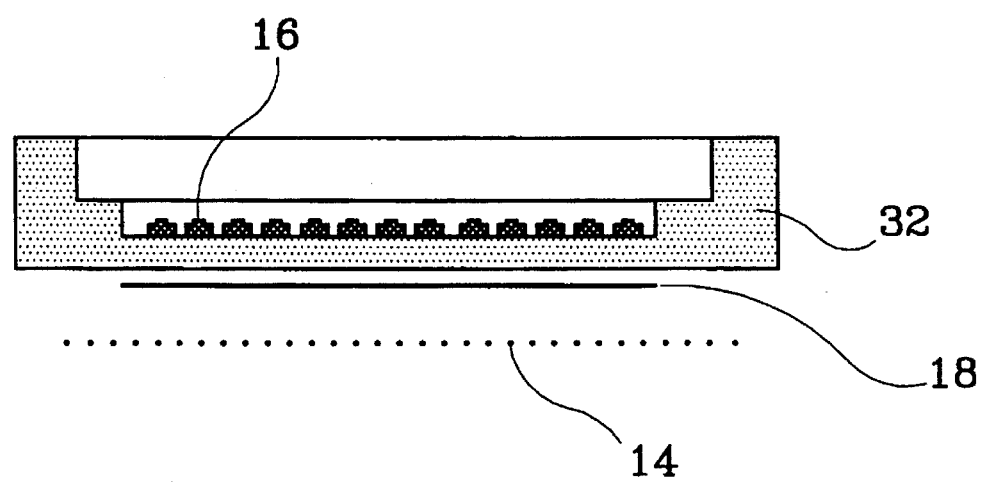

Microlenses 16 can be formed on the backside of Fabry-Perot cavity wafer 32. Silicon wafer 32 may be made thin to achieve closer proximity between each microlens 16 and corresponding detector 14 to avoid beam spreading. Thus, microlenses 16 are formed on a thinned silicon wafer 32. Microlenses 16 are located at the focal plane and detector 14 or array 14 is in close proximity. With a single detector 14, location is not as critical as with a focal plane wherein spatial resolution degrades with distance. FIG. 14a shows the integrated microlenses 16 on an ordinary silicon wafer and FIG. 14b shows an integrated microlens 16 and a thinned wafer 32.

Technical bulk PZT ceramic is a common material for driving devices at high speed with modest voltages. In contrast PZT films provide a number of advantages over the bulk materials. For instance, a PZT bimorph of small size is capable of forces sufficient to move a small mass and thus require little real estate or area in the chip. PZT microactuators 26 have such characteristics. Unlike capacitors, PZT actuators 26 leave the majority of the real estate or area of the chip available for IR transmission. PZT forces and displacements are linear with voltage, unlike capacitance actuation in which the forces diminish inversely with spacing.

The small size of microfabricated structures makes them compatible with arrays such as IR detector 14, IR emitters and displays. The ability to mount the Fabry-Perot cavity directly in front of array 14 reduces the cost of cavity 18 and makes possible the use of microlenses 16. Wafer to wafer metallic bonding using thin film solders and deposited metal or electroplated metal spacers allows device 10 to be integrated into an integral vacuum package to lower fabrication costs, reduce complexity, enhance environmental ruggedness and provide total wavelength tunable functionality in a single die. Squeeze film damping, a concern in microstructures, is eliminated by vacuum packaging. The problem with dust particles is eliminated with the mounting of the system in an encapsulated chamber.

The low mass of structure of device 10 means that active control can be used to rapidly change cavity 18 dimensions. Further, the low mass minimizes sensitivity by accelerating vibration shock. A combination of capacitive sense at four corners of the cavity combined with a piezoelectric drive provides active control of cavity tuning and scanning. Active compensation for temperature drifts, vibrations and acceleration is achieved.

Because of the small size of device 10, it is easier to stabilize cavity 18 even though the dimensions of array 14 are small, cavity 18 spacings are about the same as in a macroscopic system. The shorter support legs and overall device size reduce thermal expansion effects. An additional TE cooler is connected to the package as the bolometer arrays can be used to stabilize cavity 18 as needed. The TE cooler requires little power.

Depending on the resolution desired and the optical system in place, a spatial filter may be needed in front of microlens 16 to block radiation from intermediate field points.

Some of the characteristics of device 10 involve Fabry-Perot cavity 18 mirrors 20 and 22 having extremely flat polysilicon, silicon nitride and silicon oxide structures. PZT thin films and sensing capacitors are used for active control such as piezoelectric actuation to tune and control mirrors 20 and 22 of cavity 18. Microlenses 16 increase transmission and enhance the spectral resolution of filter 10. IR emitters and detectors are microstructures. The vacuum encapsulation of detector 14 and Fabry-Perot cavity 18 reduces air damping and particulates.

Figure 15:
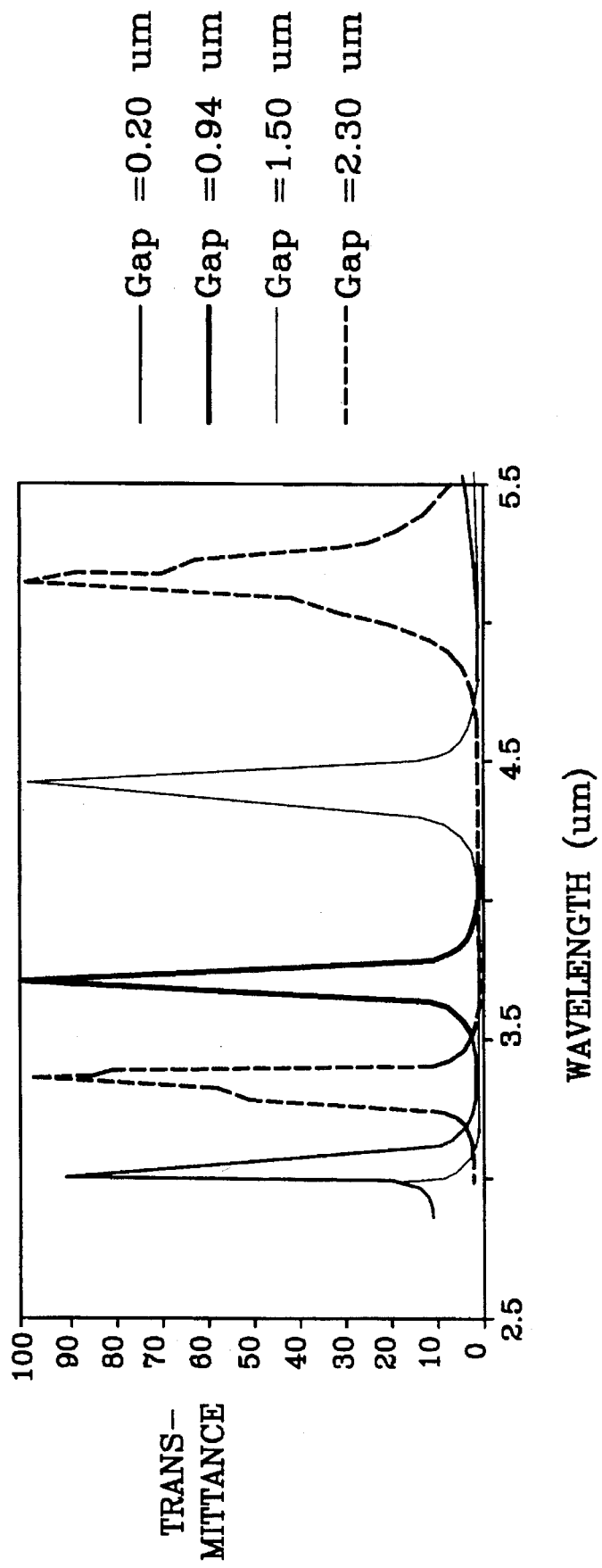
FIG. 15 reveals a set of transmittance characteristics of the microfilter.

FIG. 15 shows the tunable Fabry-Perot cavity spectral range with the transmittance of IR radiation versus the wavelength for gaps of 0.20 micrometer, 0.94 micrometer, 1.50 micrometers and 2.30 micrometers, respectively.

Figure 16A:
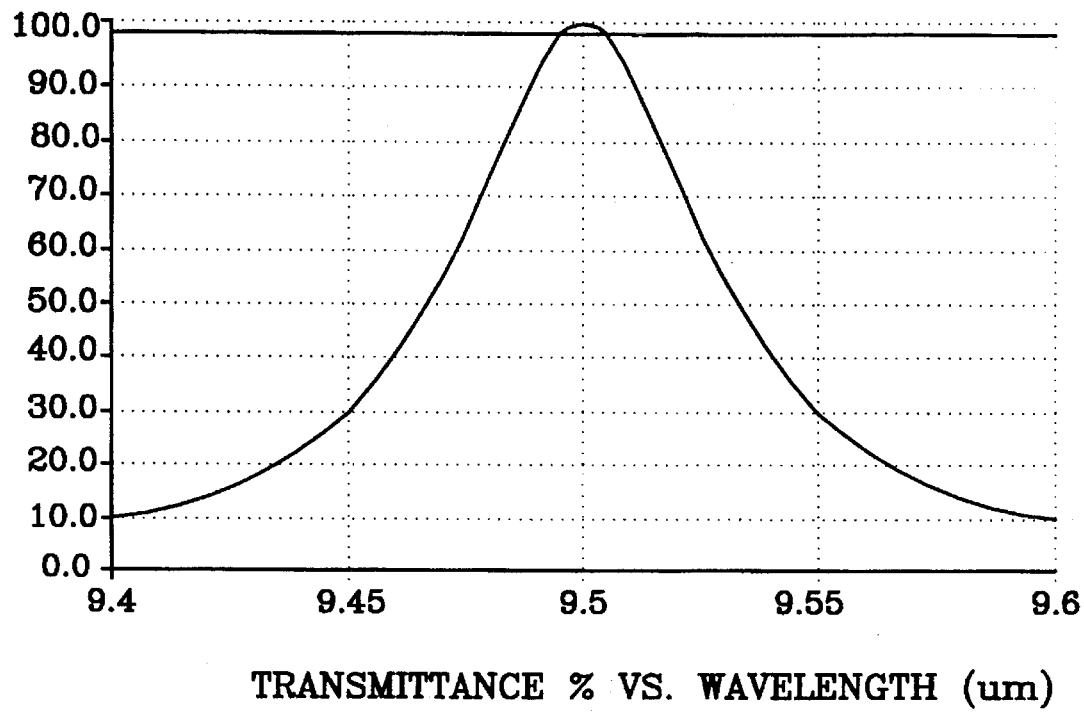
FIGS. 16a–16c show bandpass characteristics of the Fabry-Perot filter relative to the number of layers on the mirrors.
Figure 16B:
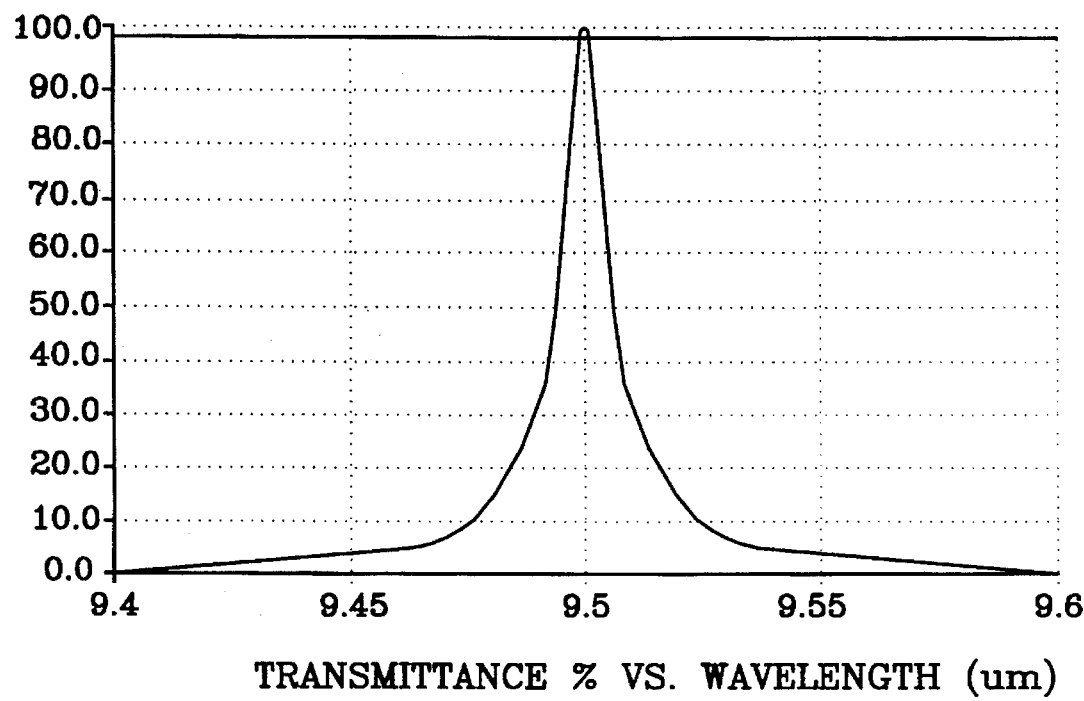
Figure 16C:
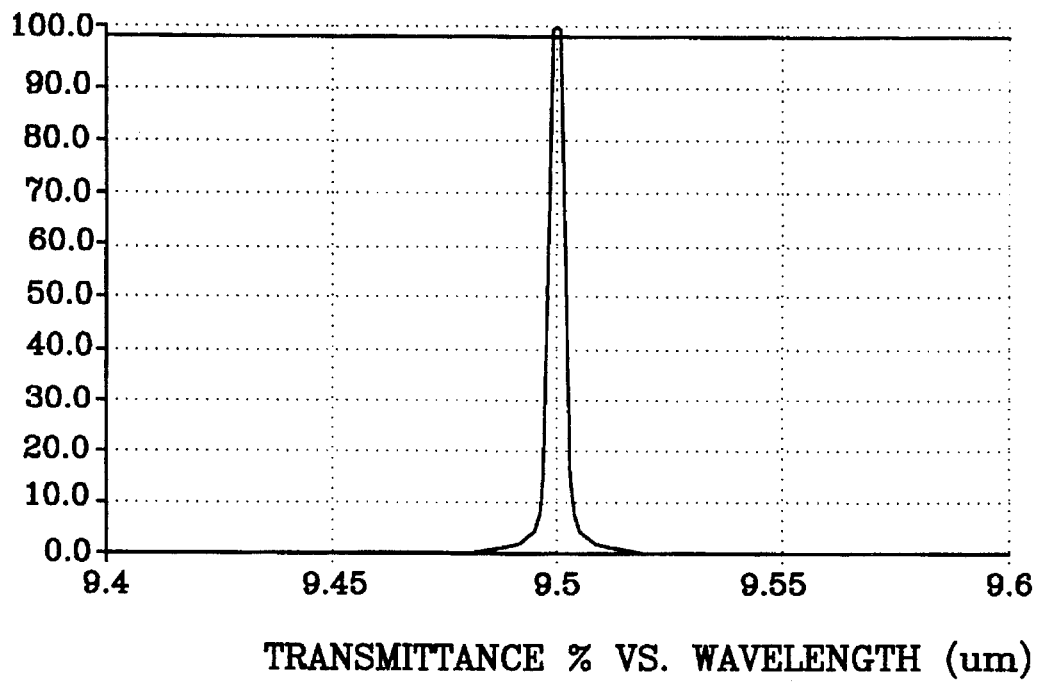

FIGS. 16a–16c show the relationships of the transmittance of Fabry-Perot filter 18 (of, for instance, device 62 in FIG. 3) adjusted for a 9.5 micron wavelength of light, versus wavelength, for various mirrors 20 and 22. FIG. 16a reveals the filtering of filter 18 having mirrors 20 and 22 with three pairs of layers on each mirror. FIGS. 16b and 16c reveal the filtering of filter 18 having mirrors 20 and 22 with four and five pairs of layers, respectively, on each mirror. More layers on mirrors 20 and 22 indicate an increasingly narrow bandpass characteristics of filter 18.

Figure 17A:
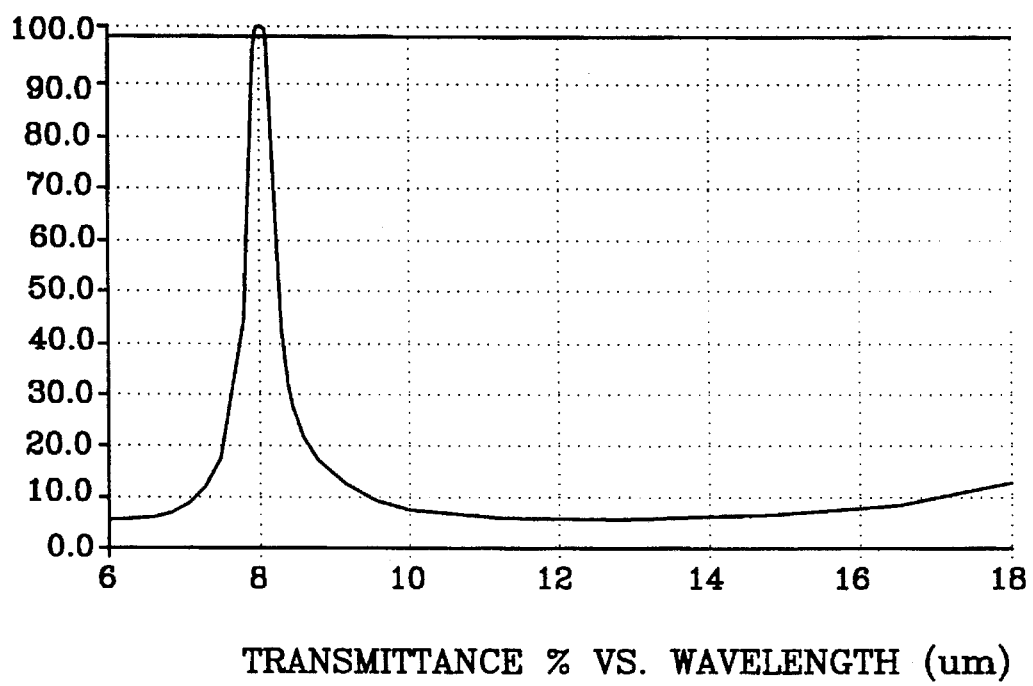
FIGS. 17a and 17b reveal the effect of the angle of incident light on the frequency of the filter.
Figure 17B:
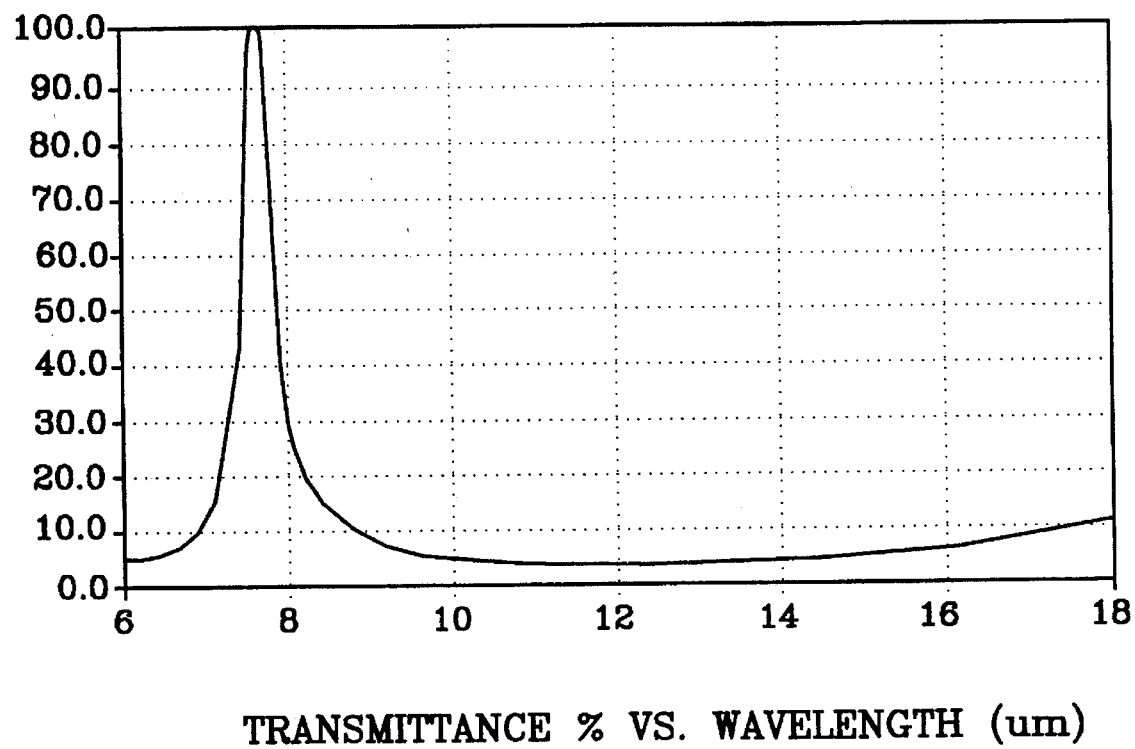

FIG. 17a and 17b are graphs of transmittance versus wavelength for filtering light at 8 microns through filter 18 (of, for instance, device 62 in FIG. 3) having mirrors 20 and 22 with one pair of layers on each. The incidence angle of the light rays relative to a perpendicular to the surface of the array of lenses 16 is zero degrees for FIG. 17a and 20 degrees for FIG. 17b. The 20 degree shift in the incidence of the incoming light shifts the center wavelength of filtered light by about ¼ of a micron.

Figure 18:
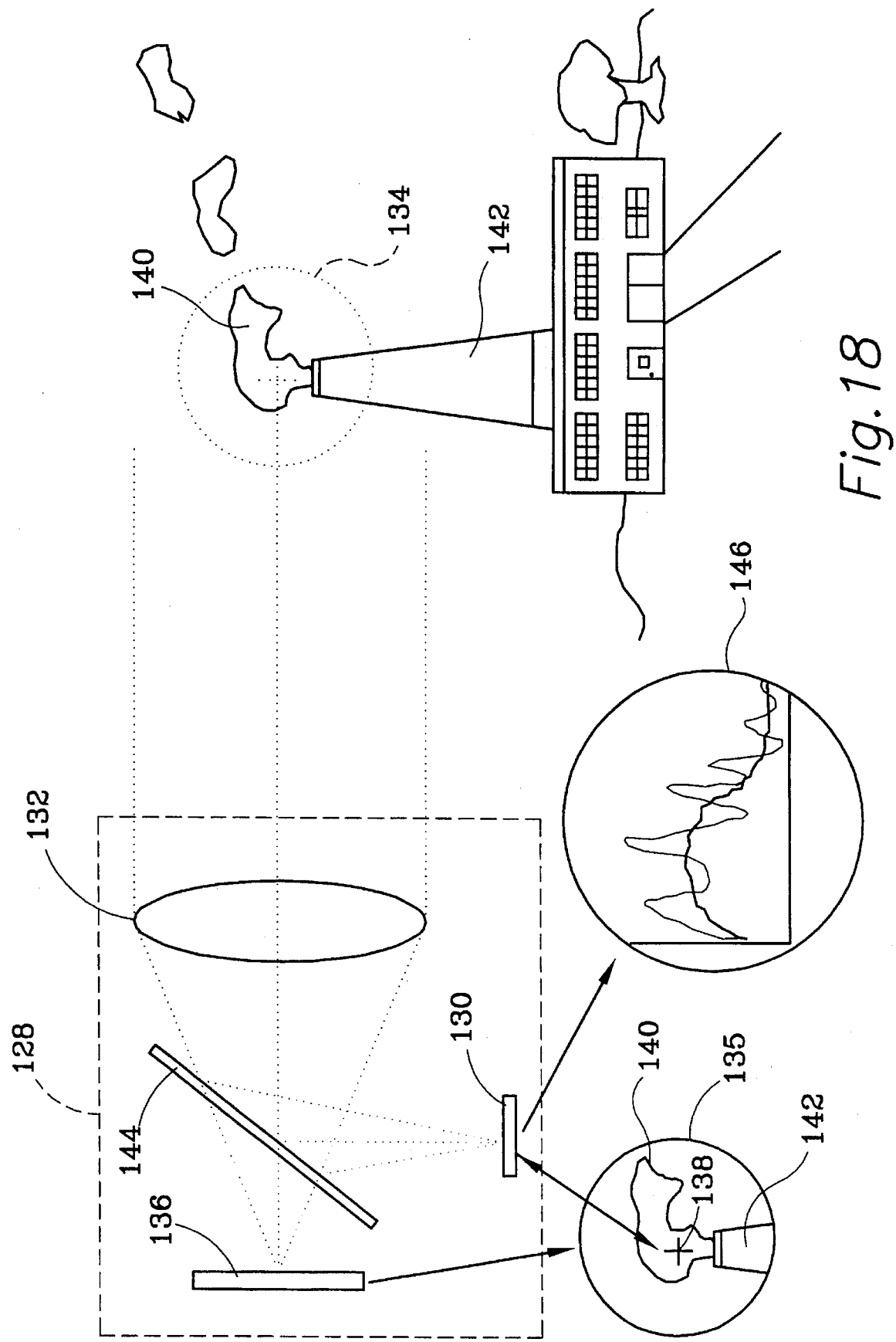
FIG. 18 shows a combination multiple and single filter-detector in use for spectral analysis.

FIG. 18 shows a system 128 which exhibits the use of a system 126 with a Fabry-Perot microfilter detector 130. Microlens 132 focuses target area 134 onto an IR microbolometer array or CCD array 136 for positioning target 134 as an image 135. Cross hairs 138 focus on suspected pollutants in smoke 140 from a smokestack 142. That focused area of crosshairs 138 is reflected by beamsplitter 144 on to a piezo-tunable IR Fabry-Perot microfilter detector 130 (like one of the detectors shown in FIGS. 1–9). Spectral measurements of the light are with tunable filter detector 130 for mapping a spectral analysis output 146, which may indicate, for example, parts per million (ppm) of a particular substance (such as 25 ppm of $CO_2$) in smoke 140 broadband backlighted by, for example, ambient sunlight, according to the amount of absorbance of light detected at a particular wavelength (such as at the 4.3 micron $CO_2$ line).

Figure 19:
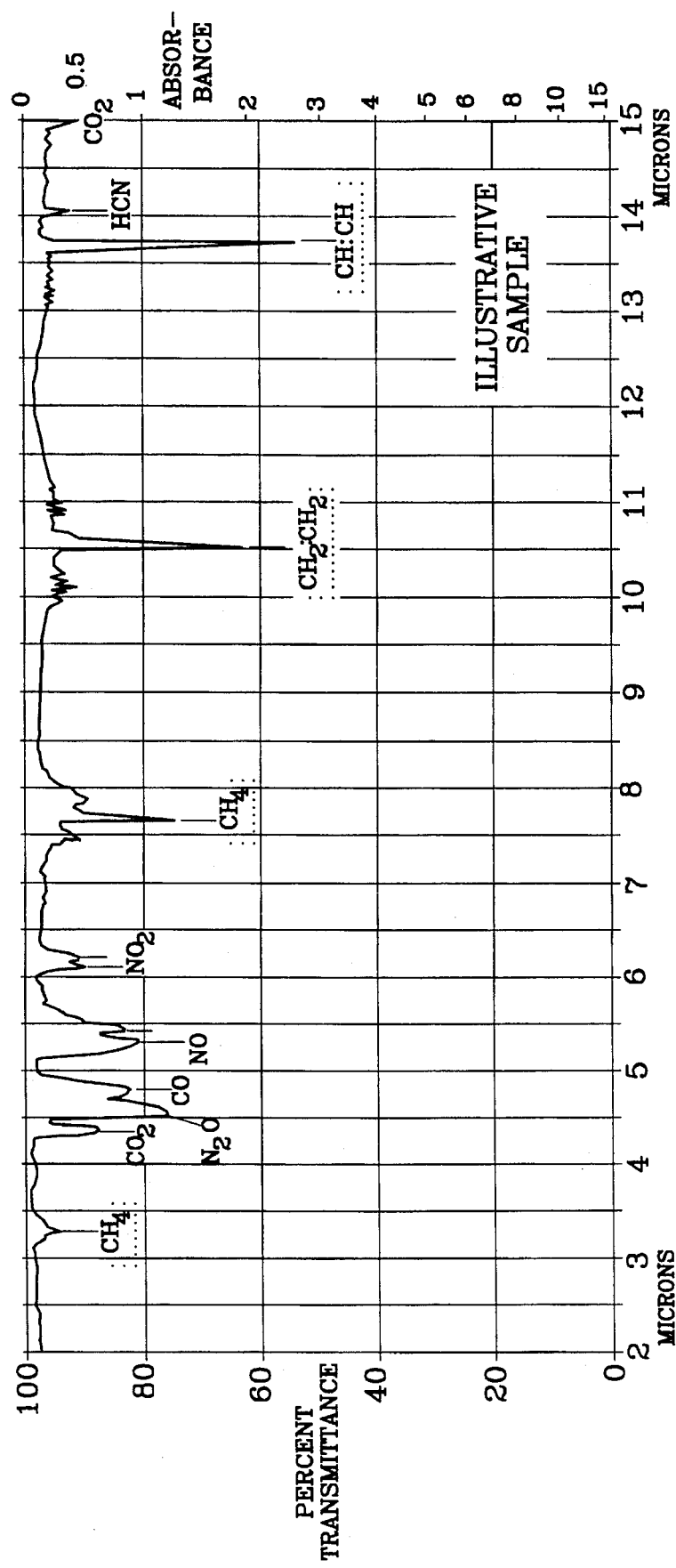
FIG. 19 is a chart revealing absorption lines in a detected sample

FIG. 19 is a chart showing absorption lines for various substances as an illustrative sample.

We claim:

1. A monolithic micro tunable Fabry-Perot filter-detector comprising:

a first wafer;

an array of detectors formed on said first wafer;

a ring formed on said first wafer, said ring encircling said array of detectors;

a second wafer;

a first mirror formed on said second wafer;

a bridge structure;

a second mirror formed on said bridge structure;

a Fabry-Perot cavity formed by attaching said bridge structure to said second wafer such that said first and second mirrors face each other; and an actuator formed on said bridge proximate to said second wafer, wherein said actuator can cause said first and second mirrors to vary in distance from each other so as to tune said Fabry-Perot cavity; and wherein said second wafer is situated on said ring resulting in a hermetically sealed confinement containing said Fabry-Perot cavity and said array of detectors.

2. A tunable Fabry-Perot filter-detector comprising:

a first wafer;

a first mirror formed on said first wafer;

a second wafer;

a second mirror formed on said second wafer;

at least one adjustable support connected to said first and second wafers;

a third wafer;

at least one detector formed on said third wafer; and a support barrier connected to said first and third wafer, in a manner that encloses said second wafer, and said first and second mirrors between said first and third wafers and within said support barrier.

3. The filter detector of claim 2 further comprising:

a microlens array formed in said first wafer; and wherein said adjustable support is a thin film piezoelectric actuator for adjusting a distance between said first and second mirrors so as to tune a Fabry-Perot filter formed by said first and second mirrors.

4. A monolithic tunable cavity filter-detector comprising:

a substrate;

an array of microbolometer detectors formed on said substrate;

a support wall formed on a perimeter of said substrate;

a window wafer formed on said support wall;

a first mirror formed on said window wafer;

a bridge having ends attached to said window wafer;

a second mirror formed on said bridge, said mirror proximate and approximately parallel to said first mirror, for forming a Fabry-Perot cavity; and at least one piezoelectric actuator formed on the ends of said bridge, for providing a piezoelectric actuated adjustment of a distance between said first and second mirrors so as to tune the Fabry-Perot cavity to a particular wavelength of light.

5. The filter-detector of claim 4 wherein said window wafer comprises at least one microlens.

6. The filter-detector of claim 5 wherein the at least one microlens is a diffractive lens.

7. The filter-detector of claim 6 wherein the diffractive lens is a binary diffractive lens.

8. The filter-detector of claim 5 wherein the at least one microlens is a refractive lens.

9. The filter-detector of claim 6 further comprising an anti-reflective coating on said window wafer.

10. The filter-detector of claim 9 further comprising a spatial filter formed on said window wafer.

11. The filter-detector of claim 4 further comprising:

at least one light source, situated on said substrate, for emitting a first light at a first frequency through said second mirror into the Fabry-Perot cavity; and control electronics connected to at least one detector of said array of microbolometer detectors and to said at least one piezoelectric actuator, wherein said control electronics has a capability to provide a first signal having a first magnitude to said at least one piezoelectric actuator in response to a second magnitude of a second signal from the at least one microbolometer detector responsive to the first light from the Fabry-Perot cavity, such that the first signal to the at least one piezoelectric actuator adjusts the distance between said first and second mirrors of the Fabry-Perot cavity so that the magnitude of the second signal approaches a particular value and is maintained at the particular value, thereby resulting in the Fabry-Perot cavity being tuned to the first frequency of said first light.

12. The filter-detector of claim 4 further comprising:

a light source, situated external to the detector, for emitting a first light at a first wavelength through said window wafer and said first mirror into a first portion of the Fabry-Perot cavity; and control electronics connected to at least one detector of said array of microbolometer detectors, the detector being proximate to the first portion of the Fabry-Perot cavity, and to said at least one piezoelectric actuator, wherein said control electronics has a capability to provide a first signal having a first magnitude to said at least one piezoelectric actuator in response to a second magnitude of a second signal from the at least one detector in proportion to light from the first portion of the Fabry-Perot cavity, the first portion being proximate to the at least one detector, such that the first signal to the at least one piezoelectric actuator adjusts the distance between said first and second mirrors of the Fabry-Perot cavity so that the magnitude of the second signal approaches a particular value and is maintained at the particular value, thereby resulting in the Fabry-Perot cavity being tuned to the first wavelength of said first light.

* * * * *